(12) United States Patent
Sasaki et al.

(10) Patent No.: US 11,264,662 B2
(45) Date of Patent: Mar. 1, 2022

(54) MATERIALS FOR POWER STORAGE DEVICES AND POWER STORAGE DEVICES USING THE SAME

(71) Applicant: TOPPAN PRINTING CO., LTD., Tokyo (JP)

(72) Inventors: Satoshi Sasaki, Tokyo (JP); Takuya Muraki, Tokyo (JP); Tomohiko Yamazaki, Tokyo (JP); Masayoshi Suzuta, Tokyo (JP)

(73) Assignee: TOPPAN PRINTING, CO., LTD., Tokyo (JP)

( * ) Notice: Subject to any disclaimer, the term of this patent is extended or adjusted under 35 U.S.C. 154(b) by 109 days.

(21) Appl. No.: 16/735,271

(22) Filed: Jan. 6, 2020

(65) Prior Publication Data

US 2020/0144562 A1 May 7, 2020

Related U.S. Application Data

(63) Continuation of application No. PCT/JP2018/025571, filed on Jul. 5, 2018.

(30) Foreign Application Priority Data

Jul. 10, 2017 (JP) .............................. JP2017-134857
Jul. 31, 2017 (JP) .............................. JP2017-148249

(51) Int. Cl.
*H01M 50/124* (2021.01)
*H01M 50/116* (2021.01)
(Continued)

(52) U.S. Cl.
CPC .......... *H01M 50/124* (2021.01); *H01G 11/80* (2013.01); *H01M 50/116* (2021.01); *H01M 50/183* (2021.01)

(58) Field of Classification Search
CPC ............. H01M 50/124; H01M 50/116; H01M 50/183; H01G 11/80
See application file for complete search history.

(56) References Cited

U.S. PATENT DOCUMENTS

2017/0141362 A1* 5/2017 Ijuin ...................... H01G 11/78
2017/0365825 A1 12/2017 Ijuin et al.
2018/0108880 A1* 4/2018 Muroi ..................... B32B 27/36

FOREIGN PATENT DOCUMENTS

JP 2013-101765 A 5/2013
JP 2015-166261 A 9/2015
(Continued)

OTHER PUBLICATIONS

International Searching Authority, "International Search Report," issued in connection with International Patent Application No. PCT/JP2018/025571, dated Sep. 11, 2018.
(Continued)

*Primary Examiner* — Stewart A Fraser
(74) *Attorney, Agent, or Firm* — Foley & Lardner LLP

(57) ABSTRACT

A power storage device packaging material includes a structure including at least a substrate layer, an adhesive layer, a metal foil layer, a sealant adhesive layer, and a sealant layer, which are laminated in this order, wherein the adhesive layer has a yield stress in the range of 3500 to 6500 N/cm² and breaking elongation of 45 to 200% in a stress-strain curve determined by a tensile test at a tension rate of 6 mm/min. A power storage device packaging material according to the second aspect of the present disclosure includes a structure including at least a substrate layer, an adhesive layer, a metal foil layer, an anticorrosion treatment layer, a sealant adhesive layer, and a sealant layer, which are laminated in this order, wherein the adhesive layer has a glass transition temperature in a range of 140° C. or more and 160° C. or less.

13 Claims, 4 Drawing Sheets

(51) Int. Cl.
    *H01M 50/183*    (2021.01)
    *H01G 11/80*     (2013.01)

(56) References Cited

FOREIGN PATENT DOCUMENTS

| JP | 2015-176764 A | 10/2015 |
|---|---|---|
| WO | WO-2016/140256 A | 9/2016 |

OTHER PUBLICATIONS

International Searching Authority, "Written Opinion," issued in connection with International Patent Application No. PCT/JP2018/025571, dated Sep. 11, 2018.
Extended European Search Report dated Mar. 27, 2020 for corresponding Application No. 18832483.4.

* cited by examiner

MATERIALS FOR POWER STORAGE DEVICES AND POWER STORAGE DEVICES USING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/025571, filed on Jul. 5, 2018, which is based upon and claims the benefit of priority to Japanese Patent Applications Nos. 2017-134857, filed on Jul. 10, 2017, and 2017-148249, filed on Jul. 31, 2017; the disclosures of which are all incorporated herein by reference in their entireties.

TECHNICAL FIELD

The present disclosure relates to packaging materials for power storage devices and power storage devices using the same.

BACKGROUND ART

Known power storage devices include secondary batteries such as lithium ion batteries, nickel hydride batteries, and lead batteries, and electrochemical capacitors such as electric double layer capacitors. As mobile devices have been downsized or limited in installation space, there have been demands for further downsized power storage devices. Accordingly, lithium ion batteries having high energy density have been attracting attention. The conventional packaging materials for lithium ion batteries have been metal cans. However, multilayer films have been increasingly used due to their light weight, high heat dissipation, and low production cost.

In a configuration of lithium ion batteries using such a multilayer film as a packaging material, battery contents (e.g., cathode, separator, anode, electrolyte solution) are covered with packaging materials that include an aluminum foil layer to thereby prevent moisture from penetrating into the battery. Lithium ion batteries using such a configuration are referred to as aluminum laminated lithium ion batteries.

Known examples of aluminum laminated lithium ion batteries include embossed lithium ion batteries. An embossed lithium ion battery is produced by forming a recess for accommodate the battery contents in a portion of the packaging material by cold forming, folding the remaining part of the packaging material, and sealing the edge portions by heat sealing (see, for example, PTL 1). In such lithium ion batteries, more battery contents can be stored by increasing the depth of the recess formed by cold forming, and thus higher energy density can be achieved.

[Citation List] [Patent Literature] PTL 1: JP 2013-101765 A

SUMMARY OF THE INVENTION

Technical Problem

The packaging materials for power storage devices described in PTL 1 have room for improvement in deep drawing properties. The present disclosure has been made to provide a packaging material for power storage devices with improved deep-drawing properties, and a power storage device using the same.

Solution to Problem

A power storage device packaging material according to the first aspect of the present disclosure includes a structure including at least a substrate layer, an adhesive layer, a metal foil layer, a sealant adhesive layer, and a sealant layer, which are laminated in this order.

In the power storage device packaging material according to the first aspect, the adhesive layer has a yield stress in the range of 3500 to 6500 N/cm$^2$ and breaking elongation of 45 to 200% in a stress-strain curve determined by a tensile test at a tension rate of 6 mm/min. The substrate layer has conventionally played a role of protecting the metal foil layer during deep drawing, and the adhesive layer has been mainly required to provide adhesion between the substrate layer and the metal foil layer. According to the packaging material of this aspect, however, the adhesive layer has the yield stress and breaking elongation of the above ranges to thereby ensure improved deep drawing properties that could not have been achieved only by improvement of the substrate layer. Although the reason that the deep drawing properties are improved by providing the adhesive layer with the yield stress and breaking elongation of the above ranges has not been fully elucidated, the present inventors consider it to be as follows: Since the above physical properties of the adhesive layer are close to those of the metal foil layer compared with the conventional art, the behavior of the adhesive layer when a stress is applied by deep drawing becomes more like that of the metal foil layer, and thus the adhesive layer is more likely to follow the metal foil layer after deep drawing.

The above power storage device packaging material preferably further includes anticorrosion treatment layers respectively provided on both surfaces of the metal foil layer. With this configuration, adhesion between the substrate layer and the metal foil layer can be further improved. The anticorrosion treatment layers preferably include a rare earth element oxide, and phosphoric acid or phosphate. With this configuration, adhesion between the substrate layer and the metal foil layer can be further improved.

In the above power storage device packaging material, the rare earth element oxide is preferably a cerium oxide. With this configuration, adhesion between the substrate layer and the metal foil layer can be further improved.

A power storage device packaging material according to the second aspect includes a structure including at least a substrate layer, an adhesive layer, a metal foil layer, a first anticorrosion treatment layer, a sealant adhesive layer, and a sealant layer, which are laminated in this order, wherein the adhesive layer has a glass transition temperature in a range of 140° C. or more and 160° C. or less.

The substrate layer has conventionally played a role of protecting the metal foil layer during deep drawing, and the adhesive layer has been mainly required to provide adhesion between the substrate layer and the metal foil layer. According to the packaging material of this aspect, however, the adhesive layer has the glass transition temperature of the above ranges to thereby ensure improved deep drawing properties that could not have been achieved only by improvement of the substrate layer. That is, the packaging material of this aspect has been achieved focusing on the hardness of the adhesive layer. By virtue of the sufficient hardness of the adhesive layer, the packaging material can withstand shear stress applied to the adhesive layer when it is stretched by deep drawing, and ensure good deep drawing properties. On the other hand, due to the adhesive layer being not too hard, the adhesive layer is prevented from being rigid and fragile, and can follow the stretching of the substrate layer or the metal foil layer to thereby reduce occurrence of fine breakage in the adhesive layer and ensure good deep drawing properties. The present inventors have found that such an appropriate hardness of the adhesive layer can be achieved by preparing an adhesive layer having a glass transition temperature in the range of 140° C. or more and 160° C. or less.

In the power storage device packaging material according to the present disclosure, the adhesive layer preferably includes a reaction product of a polyester polyol and isocyanate compound. Furthermore, the isocyanate compound is preferably an aromatic isocyanate compound. Still furthermore, the aromatic isocyanate compound is preferably a diisocyanate adduct. With this configuration, the glass transition temperature of the adhesive layer can be easily controlled within the above range.

The power storage device packaging material according to the present disclosure preferably further includes a second anticorrosion treatment layer provided between the adhesive layer and the metal foil layer. With this configuration, adhesion between the substrate layer and the metal foil layer can be further improved, and deep drawing properties can be further improved.

The power storage device packaging material according to the present disclosure preferably further includes an adhesion-enhancing treatment layer provided between the substrate layer and the adhesive layer. With this configuration, adhesion between the substrate layer and the adhesive layer can be further improved, and deep drawing properties can be further improved. From the viewpoint of improving these properties, the adhesion-enhancing treatment layer preferably includes at least one resin selected from the group consisting of a polyester resin, an acrylic resin, a polyurethane resin, an epoxy resin, and an acrylic grafted polyester resin.

The present disclosure further provides a power storage device including: a battery element including electrodes; leads respectively extending from the electrodes; and a container accommodating the battery element, wherein the container is formed of the power storage device packaging material with the sealant layer being located on the inside. Since such a power storage device uses the power storage device packaging material according to the present disclosure (first aspect or second aspect) as a container for accommodating the battery element, a deep recess can be formed in the container without causing breakage.

Advantageous Effects of Invention

According to the present disclosure, a power storage device packaging material having improved deep-drawing properties, and a power storage device using the same can be provided.

DETAILED DESCRIPTION

Figure 1:
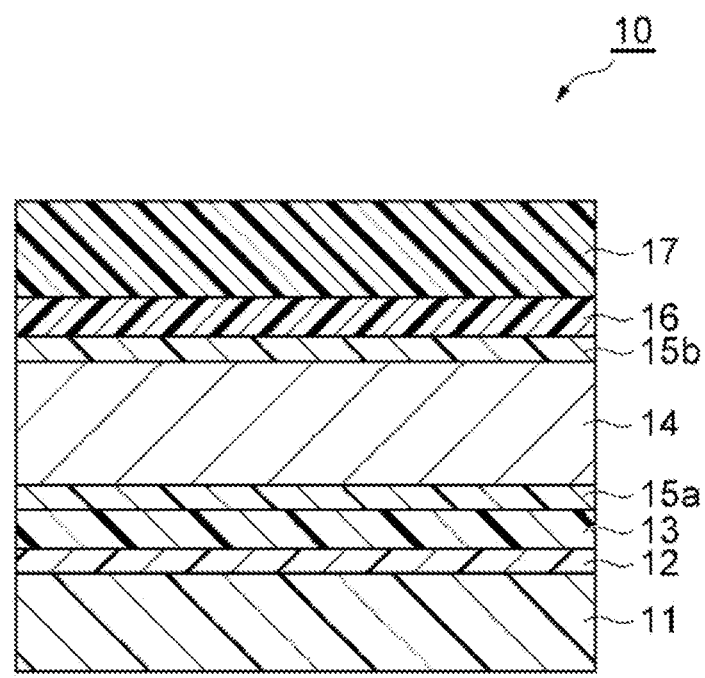
FIG. 1 is a schematic cross-sectional view of a power storage device packaging material according to an embodiment of the present disclosure.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

[Power Storage Device Packaging Material]

FIG. 1 is a schematic cross-sectional view of an embodiment of a power storage device packaging material according to the present disclosure. As shown in FIG. 1, a packaging material (power storage device packaging material) 10 of the present embodiment is a laminate including a substrate layer 11, an adhesion-enhancing treatment layer 12 provided on one surface of the substrate layer 11, an adhesive layer 13 provided on the adhesion-enhancing treatment layer 12 on a side facing away from the substrate layer 11, a metal foil layer 14 provided on the adhesive layer 13 on a side facing away from the adhesion-enhancing treatment layer 12 and having anticorrosion treatment layers 15a and 15b on both sides thereof, a sealant adhesive layer 16 provided on the metal foil layer 14 on a side facing away from the adhesive layer 13, and a sealant layer 17 provided on the sealant adhesive layer 16 on a side facing away from the metal foil layer 14. The anticorrosion treatment layer 15a is provided on a surface of the metal foil layer 14 facing the adhesive layer 13, and the anticorrosion treatment layer 15b is provided on a surface of the metal foil layer 14 facing the sealant adhesive layer 16. In use of the packaging material 10 as a material for a secondary battery, the base material layer 11 is an outermost layer and the sealant layer 17 is an innermost layer. That is, the packaging material 10 is used with the substrate layer 11 oriented outside the power storage device and the sealant layer 17 oriented inside the power storage device. Each layer will now be described.

(Substrate Layer 11)

The substrate layer 11 serves to impart heat resistance in a sealing process during production of a power storage device and reduce occurrence of breakage or pinholes during the forming process and distribution. Particularly in the case of packaging materials for large power storage devices, scratch resistance, chemical resistance, insulating properties, and the like, can also be imparted.

The substrate layer 11 preferably includes a resin film made of a resin having insulating properties. Examples of the resin film include polyester films, polyamide films, and polypropylene films. The substrate layer 11 may be a monolayer film made of one of these resin films, or a laminated film made of two or more of these resin films.

Among these films, a resin film used for the substrate layer 11 is preferably a polyester film or a polyamide film due to excellent formability. Examples of the polyester resins used to form the polyester film include polyethylene terephthalate, polybutylene terephthalate, polyethylene naphthalate, polybutylene naphthalate, and copolymerized polyesters. Examples of polyamide resins used to form the polyamide film include Nylon-6, Nylon-6,6, a copolymer of Nylon-6 and Nylon-6,6, Nylon-6,10, polymetaxylylene adipamide (MXD6), Nylon-11, and Nylon-12.

The resin film can be obtained by uniaxial stretching or biaxial stretching. From the perspective of obtaining better deep-drawing properties, a biaxially stretched film is preferred.

The stretching methods used for the biaxially stretched film include, for example, sequential biaxial stretching, tubular biaxial stretching, simultaneous biaxial stretching, and the like. From the perspective of obtaining better deep-drawing properties, the biaxially stretched film is preferably stretched by tubular biaxial stretching or simultaneous biaxial stretching.

The substrate layer 11 preferably has a thickness in the range of 6 μm to 40 μm, and more preferably 10 μm to 30 μm. When the thickness of the substrate layer 11 is 6 μm or more, the power storage device packaging material 10 tends to have improved pinhole resistance and insulation properties. When the thickness of the substrate layer 11 is 40 μm or less, the total thickness of the power storage device packaging material 10 is prevented from increasing and thus the electrical capacity of the battery is prevented from being reduced.

(Adhesion-Enhancing Treatment Layer 12)

The adhesion-enhancing treatment layer 12 is provided on one surface of the substrate layer 11 and is disposed between the substrate layer 11 and the adhesive layer 13. The adhesion-enhancing treatment layer 12 improves adhesion between the substrate layer 11 and the adhesive layer 13, and thus improves adhesion between the substrate layer 11 and the metal foil layer 14. By virtue of the adhesion-enhancing treatment layer 12 having such an effect, the adhesive layer 13 can be easily stretched in deep drawing of the power storage device packaging material 10, in which the substrate layer 11 and the metal foil layer 14 are stretched. The adhesion enhancement layer 12 may not be necessarily provided in the power storage device packaging material 10. In the absence of the adhesion-enhancing treatment layer 12, a surface of the substrate layer 11 facing the adhesive layer 13 may be corona-treated to improve adhesion between the substrate layer 11 and the adhesive layer 13 and thus between the substrate layer 11 and the metal foil layer 14.

The adhesion-enhancing treatment layer 12 is preferably a layer including at least one selected from the group consisting of a polyester resin, an acrylic resin, a polyurethane resin, an epoxy resin, and an acrylic grafted polyester resin, more preferably a layer including a polyester resin or an acrylic resin, and still more preferably a layer including a polyester resin. The adhesion-enhancing treatment layer 12 including such a resin can improve adhesion between the substrate layer and the adhesive layer, and tends to further improve the deep drawing properties. Such an adhesion-enhancing treatment layer 12 can be formed by, for example, applying a coating agent onto a surface of the substrate layer 11. The coating agent in this case contains at least one resin, as a main component, selected from the group consisting of a polyester resin, an acrylic resin, a polyurethane resin, an epoxy resin, and an acrylic grafted polyester resin.

<Polyester Resin>

From the perspective of adhesion, the polyester resin is preferably a copolyester in which a copolymerization component is introduced for lowering of the glass transition temperature. From the perspective of coating properties, the copolyester is preferably water soluble or water dispersible. Such a copolyester is preferably one in which at least one group selected from the group consisting of a sulfonic acid group and an alkali metal salt group thereof is bound (also termed hereinafter sulfonic acid group-containing copolyester).

The sulfonic acid group-containing copolyester refers to a polyester to which at least one group selected from the group consisting of a sulfonic acid group and an alkali metal salt group thereof is bound to part of a dicarboxylic acid component or a glycol component. In particular, the copolyester is preferably prepared by using an aromatic dicarboxylic acid component containing at least one group selected from the group consisting of a sulfonic acid group and an alkali metal salt group thereof, at a ratio in the range of 2 mol % to 10 mol % relative to the total acid component.

A preferred example of such dicarboxylic acid is sodium 5-sulfoisophthalate. Other examples of dicarboxylic acid components include terephthalic acid, isophthalic acid, phthalic acid, p-β-oxyethoxybenzoic acid, 2,6-naphthalenedicarboxylic acid, 4,4'-dicarboxydiphenyl, 4,4'-dicarboxybenzophenone, bis (4-carboxyphenyl) ethane, adipic acid, sebacic acid, and cyclohexane-1,4-dicarboxylic acid.

Ethylene glycol is mainly used as a glycol component for preparing the sulfonic acid group-containing copolyester. Besides, there can be used propylene glycol, butanediol, neopentyl glycol, diethylene glycol, cyclohexane dimethanol, ethylene oxide adduct of bisphenol A, polyethylene glycol, polypropylene glycol, polytetramethylene glycol, and the like. Of these materials, it is preferable to use ethylene glycol, propylene glycol, butanediol, neopentyl glycol, diethylene glycol, cyclohexane dimethanol, or the like as a copolymerizable component because miscibility with a polystyrene sulfonate salt is improved.

The polyester resin may be a modified polyester copolymer, such as a block copolymer or a graft copolymer, which is modified with polyester, urethane, or epoxy, or the like. In the present embodiment, the adhesion-enhancing treatment layer 12 may further include a resin other than the polyester resin in order to improve adhesion between the adhesion-enhancing treatment layer 12 and the substrate layer 11 and between the adhesion-enhancing treatment layer 12 and the adhesive layer 13. Examples of such a resin include a urethane resin and an acrylic resin.

<Acrylic Resin>

Examples of a usable monomer component forming an acrylic resin include: alkyl acrylate, and alkyl methacrylate (alkyl groups include a methyl group, ethyl group, n-propyl group, isopropyl group, n-butyl group, isobutyl group, t-butyl group, 2-ethyl hexyl group, lauryl group, and stearyl group); hydroxyl group-containing monomers such as 2-hydroxyethyl acrylate, 2-hydroxyethyl methacrylate, 2-hydroxypropylacrylate, and 2-hydroxypropylmethacrylate; amide group-containing monomers, such as acrylamide, methacrylamide, N-methylacrylamide, N-methylmethacrylamide, N-methylol acrylamide, N-methylol methacrylamide, N,N-dimethylol acrylamide, N-methoxymethylacrylamide, N-methoxymethylmethacrylamide, and N-phenylacrylamide; amino group-containing monomers, such as N,N-diethyl aminoethyl acrylate, and N,N-diethyl aminoethyl methacrylate; epoxy group-containing monomers, such as glycidyl acrylate, and glycidyl methacrylate; carboxyl groups, such as acrylic acid, methacrylic acid, and salts thereof (lithium salt, sodium salt, potassium salt, and the like), monomers containing these salts, and the like. These materials may be used singly, or in combination of two or more for copolymerization. Moreover, these materials may be combined with monomers other than those described above.

Examples of other monomers that can be used include: epoxy group-containing monomers such as allyl glycidyl ether; sulfonate groups such as styrene sulfonic acid, vinyl sulfonic acid and salts thereof (lithium salt, sodium salt, potassium salt, ammonium salt, and the like), or monomers containing the salts; carboxyl groups such as crotonic acid, itaconic acid, maleic acid, fumaric acid, and salts thereof (lithium salt, sodium salt, potassium salt, ammonium salt, and the like), or monomers containing the salts; monomers containing acid anhydrides such as maleic anhydride and anhydrous itaconic acid; vinyl isocyanate, allyl isocyanate, styrene, vinyl methyl ether, vinyl ethyl ether, vinyl trialkoxysilane, alkylmaleic acid monoester, alkylfumaric acid monoester, acrylonitrile, methacrylonitrile, alkylitaconic acid monoester, vinylidene chloride, vinyl acetate, and vinyl chloride. The acrylic resin may be a modified acrylic copolymer such as a block copolymer or a graft copolymer, which is modified by polyester, urethane or epoxy, or the like.

The acrylic resin used in the present embodiment preferably has a glass transition point (Tg) in the range of 0° C. to 90° C., and more preferably in the rage of 10° C. to 80° C., but is not particularly limited to these ranges. A lower Tg may impair adhesion at high temperature and high humidity, while a higher Tg may develop cracks during stretching. Therefore, from the perspective of avoiding these inconveniences, the acrylic resin preferably has a Tg in the above range.

The acrylic resin used in the present embodiment preferably has a weight average molecular weight of 100,000 or more, and more preferably 300,000 or more. A lower weight average molecular weight may impair heat resistance and humidity resistance. In the present embodiment, the adhesion-enhancing treatment layer 12 may further include a resin other than the acrylic resin in order to improve adhesion between the adhesion-enhancing treatment layer 12 and the substrate layer 11 and between the adhesion-enhancing treatment layer 12 and the adhesive layer 13. Examples of such a resin include a polyester resin and a urethane resin.

<Polyurethane Resin>

The polyurethane resin is preferably an aqueous polyurethane resin. The aqueous polyurethane resin is preferably of a self-emulsifying type because of having a small particle size and good stability. The aqueous polyurethane resin may have a particle size of approximately in the range of 10 nm to 100 nm. The aqueous polyurethane resin used in the present embodiment desirably has a glass transition point (Tg) in the range of 40° C. to 150° C. A Tg of 40° C. or more may tend to sufficiently reduce occurrence of blocking while the film is taken up onto a roll after coating. A Tg excessively higher than the drying temperature after coating may make it difficult to form a uniform film, and thus Tg is preferably 150° C. or less.

In the present embodiment, a cross-linking agent may be used together with the aqueous polyurethane resin. The cross-linking agent for the aqueous polyurethane may be a general-purpose water-soluble cross-linking agent such as a water-soluble epoxy compound. The water-soluble epoxy compound has water solubility and has two or more epoxy groups. Examples of the water-soluble epoxy compound include: polyepoxy compounds obtained by etherification of 2 mol of epichlorohydrin and 1 mol of glycol such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, or neopentyl glycol; and diepoxy compounds obtained by esterification of 2 mol of epichlorohydrin and 1 mol of dicarboxylic acid such as phthalic acid, terephthalic acid, adipic acid, or oxalic acid. However, the water-soluble epoxy compound is not limited to these examples.

The water-soluble cross-linking agent forms a cross-link with the aqueous polyurethane resin to improve water resistance and solvent resistance of the coating, and contribute to improvement in adhesion between the adhesion-enhancing treatment layer 12 and the substrate layer 11 and between the adhesion-enhancing treatment layer 12 and the adhesive layer 13. In the present embodiment, the adhesion-enhancing treatment layer 12 may further include a resin other than the urethane resin in order to improve adhesion between the adhesion-enhancing treatment layer 12 and the substrate layer 11 and between the adhesion-enhancing treatment layer 12 and the adhesive layer 13. Examples of such a resin include a polyester resin and an acrylic resin.

Further, the adhesion-enhancing treatment layer 12 may include, for example, the above resins as a main component, and a hardener such as multifunctional isocyanate, a multifunctional glycidyl compound, or a melamine-based compound. When the adhesion-enhancing treatment layer 12 includes the above resins as a main component, and a hardener such as multifunctional isocyanate, a multifunctional glycidyl compound, or a melamine-based compound, a cross-linking structure can be incorporated into the adhesion-enhancing treatment layer 12 to make the layer strong and hard. Moreover, the adhesion-enhancing treatment layer 12 may also include an anti-blocking agent such as silica in order to prevent sticking between films during winding of the film.

The adhesion-enhancing treatment layer 12 preferably has a thickness in the range of 0.02 μm to 0.5 μm, and more preferably 0.04 μm to 0.3 μm. An adhesion-enhancing treatment layer 12 with a thickness of 0.02 μm or more tends to facilitate formation of a uniform adhesion-enhancing treatment layer 12 and achieve even better adhesion-enhancing effects. An adhesion-enhancing treatment layer 12 with a thickness of 0.5 μm or less tends to even more improve deep-drawing properties of the packaging material 10.

(Adhesive Layer 13)

The adhesive layer 13 adheres the substrate layer 11 to the metal foil layer 14. The adhesive layer 13 adheres to the substrate layer 11 via the adhesion-enhancing treatment layer 12. The adhesive layer 13 has an adhesive force needed to firmly adhere the substrate layer 11 to the metal foil layer 14. In addition, the adhesive layer 13 also has conformability (ability to reliably form the adhesive layer 13 on a member without separation, even when the member is deformed, stretched or contracted) to reduce occurrence of breakage of the metal foil layer 14 by the substrate layer 11 during cold forming.

Figure 2:
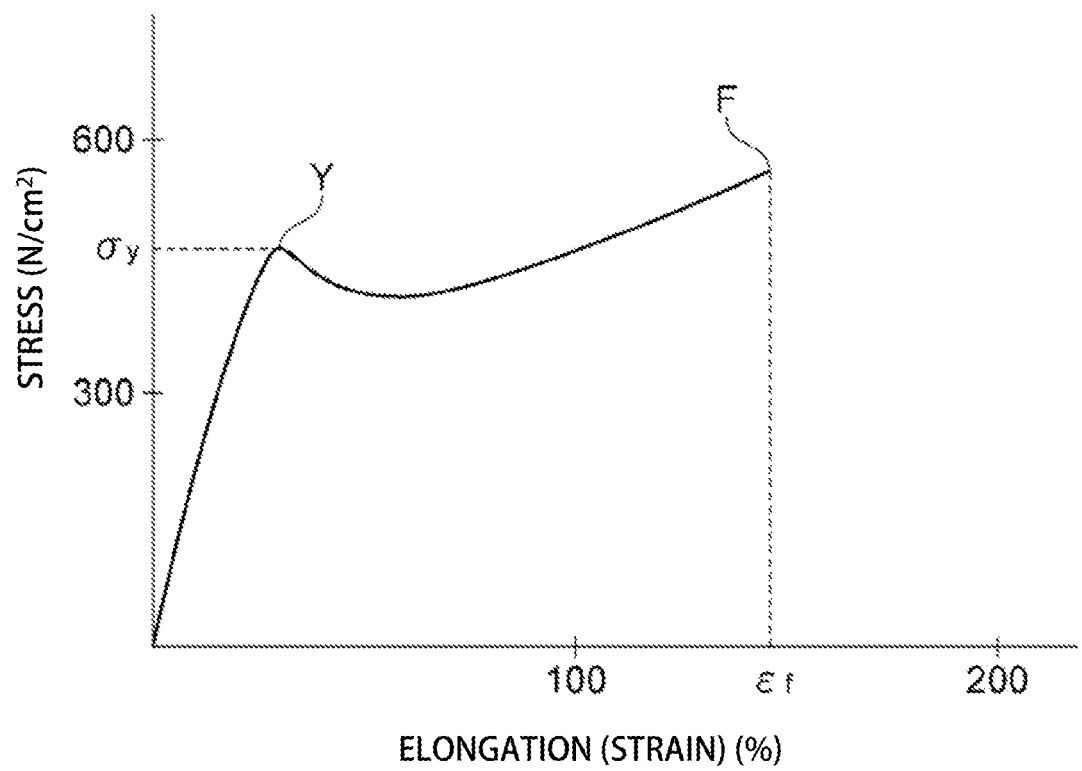
FIG. 2 is an example of a stress-strain curve of an adhesive layer obtained by a tensile test.

The characteristics of the adhesive layer 13 according to the first aspect will be described with reference to the drawings. FIG. 2 is an example of a stress-strain curve of an adhesive layer obtained by a tensile test. The horizontal axis in FIG. 2 represents the elongation (strain) (%), which is obtained as a ratio of the length of the adhesive layer elongated by the tensile test relative to the length of the adhesive layer before the tensile test. The vertical axis in FIG. 2 represents the stress (N/cm$^2$) per unit cross-sectional area of the adhesive layer in the tensile test, which is obtained from a load applied to the adhesive layer by the tensile test. In FIG. 2, a stress at the yield point Y is a yield stress $\sigma_y$, and an elongation at the breaking point F is a breaking elongation $\varepsilon_f$.

The adhesive layer 13 has a yield stress $\sigma_y$ in the range of 3500 to 6500 N/cm$^2$ in the stress-strain curve determined by the tensile test at a tension rate of 6 mm/min. The yield stress $\sigma_y$ of the adhesive layer 13 is preferably 4000 N/cm$^2$ or more, more preferably 4400 N/cm$^2$ or more, and still more preferably 5000 N/cm$^2$ or more. Further, the yield stress $\sigma_y$ of the adhesive layer 13 is preferably 6000 N/cm$^2$ or less. When the yield stress $\sigma_y$ is 3500 N/cm$^2$ or more, the adhesive layer can withstand shear stress applied during deep drawing, and further reduce separation at the interface to the substrate layer 11 or the metal foil layer 14 to thereby improve the deep drawing properties. Further, when the yield stress $\sigma_y$ is within the above range, the deformation behavior of the adhesive layer 13 due to the stress during deep drawing becomes close to that of the metal foil layer 14. Accordingly, the occurrence of shear stress at the interface between the adhesive layer 13 and the metal foil layer 14 during deep drawing can be reduced, and improved deep drawing properties are easily achieved.

Further, the adhesive layer 13 has a breaking elongation $\varepsilon_f$ in the range of 45 to 200% in the stress-strain curve determined by the tensile test at the tension rate of 6 mm/min. The breaking elongation $\varepsilon_f$ of the adhesive layer 13 is preferably 70% or more, and more preferably 100%. In addition, the breaking elongation $\varepsilon_f$ of the adhesive layer 13 may be 150% or less, or may be 120% or less. When the breaking elongation $\varepsilon_f$ is within the above range, breakage due to deep drawing becomes less likely to occur, and thus the formability is more likely to be improved.

An adhesive constituting the adhesive layer 13 can be a two-part curing type polyurethane adhesive including, for example, a base resin made of a polyol such as polyester polyol, polyether polyol, and acrylic polyol, and a hardener such as an aromatic or aliphatic isocyanate. In this adhesive, the molar ratio (=NCO/OH) of the isocyanate group of the hardener to the hydroxyl group of the base resin is preferably in the range of 1 to 10, and more preferably 2 to 5. The yield stress $\sigma_y$ and the breaking elongation $\varepsilon_f$ of the adhesive layer 13 can be controlled by, for example, the compound ratio of the base resin and the hardener, the types of polyol and isocyanate, and the like.

After coating, the polyurethane adhesive is aged at 40° C. for 4 days or longer, for example. The aging advances reaction of the hydroxyl group of the base resin with the isocyanate group of the hardener, allowing more firm adhesion of the substrate layer 11 to the metal foil layer 14.

The characteristics of the adhesive layer 13 according to the second aspect will be described. The adhesive layer 13 has the glass transition temperature (Tg) of 140° C. or more and 160° C. or less. When the Tg of the adhesive layer 13 is 140° C. or more, sufficient hardness is imparted to the adhesive layer, and the packaging material 10 can withstand shear stress applied to the adhesive layer 13 when it is stretched by deep drawing, and ensure good deep drawing properties. Further, when the Tg of the adhesive layer 13 is 160° C. or less, the adhesive layer 13 is prevented from being rigid and fragile, and can follow the stretching of the adjacent substrate layer 11 or the metal foil layer 14 when the packaging material 10 is stretched by deep drawing to thereby reduce occurrence of fine breakages in the adhesive layer 13 and ensure good deep drawing properties. The Tg of the adhesive layer 13 is preferably 142° C. or more, more preferably 144° C. or more, and still more preferably 146° C. or more. Further, the Tg of the adhesive layer 13 is preferably 158° C. or less, more preferably 155° C. or less, and still more preferably 151° C. or less.

The adhesive constituting the adhesive layer 13 is designed so that the Tg is within the above range. Examples of the adhesive constituting the adhesive layer 13 include a polyurethane-based adhesive and an epoxy-amine based adhesive. The above adhesive is preferably a polyurethane-based adhesive or an epoxy-amine based adhesive, and more preferably a polyurethane-based adhesive.

The polyurethane-based adhesive may be a two-part curing type polyurethane-based adhesive including a base resin made of polyol and a hardener made of an isocyanate compound. Examples of the polyol include polyester polyol, polyether polyol, and acrylic polyol. The polyol is preferably a polyester polyol from the viewpoint of improvement of the Tg of the adhesive layer 13 and ease of control of the Tg to be within the above range.

The isocyanate compound may be an aromatic isocyanate compound or may be an aliphatic isocyanate compound. The isocyanate compound is preferably an aromatic isocyanate compound from the viewpoint of improvement of the Tg of the adhesive layer 13 and ease of control of the Tg to be within the above range. The use of an aromatic isocyanate compound for the adhesive tends to provide improved deep drawing properties. The aromatic isocyanate compound is a compound in which an isocyanate group is directly bound to an aromatic ring. Further, examples of the aromatic isocyanate compound include aromatic isocyanate such as tolylene diisocyanate, and 4,4' diphenylmethane diisocyanate. Examples of the aliphatic isocyanate compound include hydrogenated products of aromatic diisocyanate, aliphatic diisocyanate compounds such as hexamethylene diisocyanate, xylylene diisocyanate, and isophorone diisocyanate.

The isocyanate compound is preferably a diisocyanate derivative. Examples of the diisocyanate derivative include an adduct form obtained by reacting diisocyanate with polyvalent alcohol such as trimethylolpropane; biuret form obtained by reacting diisocyanate with water or tertiary alcohol; and an isocyanurate form, which is a trimer of diisocyanate. The diisocyanate derivative is preferably an adduct form or an isocyanurate form, and more preferably an adduct form from the viewpoint of ease of control of the Tg of the adhesive layer 13 to be within the above range. The use of adduct form of diisocyanate for the adhesive tends to provide improved deep drawing properties.

In the above polyurethane-based adhesive, the ratio $N_C/N_B$ (=NCO/OH (molar ratio)), which is the ratio of the quantity of isocyanate groups, or the hardener reactive groups, $N_C$, to the quantity of hydroxyl groups, or the base resin reactive groups, $N_B$, is preferably in the range of 10 to 30. The ratio $N_C/N_B$ of 10 or more improves the Tg of the adhesive layer 13 and facilitates the control of the Tg to be 140° C. or more. The ratio $N_C/N_B$ of 30 or less reduces the likeliness of the adhesive layer 13 having excessive tack before aging, and makes the handling easier. From the similar viewpoint, the ratio $N_C/N_B$ is more preferably in the range of 15 to 30, and still more preferably in the range of 20 to 30.

After coating, the polyurethane adhesive is aged at 40° C. for 4 days or longer, for example. The aging advances reaction of the hydroxyl group of the base resin with the isocyanate group of the hardener, allowing more firm adhesion of the substrate layer 11 to the metal foil layer 14. In other words, since the adhesive layer 13 includes a reactive product of polyol and isocyanate compound, more firm adhesion of the substrate layer 11 to the metal foil layer 14 can be achieved.

The epoxy-amine based adhesive may be a two-part curing type epoxy-amine based adhesive including a base resin made of epoxy resin and a hardener made of an amine compound. In the above epoxy-amine based adhesive, the ratio $N_C/N_B$ (=amine group/epoxy group (molar ratio)), which is the ratio of the quantity of epoxy group, or the hardener reactive group, $N_C$, to the quantity of amine group, or the base resin reactive group, $N_B$, is preferably in the range of 1.5 to 3.0. The ratio $N_C/N_B$ of 1.5 or more improves the Tg of the adhesive layer 13 and facilitates the control of the Tg to be 140° C. or more. The ratio $N_C/N_B$ of 3.0 or less facilitates the control of the Tg of the adhesive layer 13 to be 160° C. or less, and reduces the likeliness of the adhesive layer 13 having excessive tack before aging, and makes the handling easier.

After being applied, the epoxy-amine based adhesive is aged at 50° C. for 3 days or longer, for example. The aging advances the reaction of the epoxy group of the base resin with the amine group of the hardener, allowing more firm adhesion of the substrate layer 11 to the metal foil layer 14. In other words, since the adhesive layer 13 includes a reactive product of epoxy resin and amine compound, more firm adhesion of the substrate layer 11 to the metal foil layer 14 can be achieved.

From the perspective of obtaining desired adhesive strength, conformability, processability, and the like, the thickness of the adhesive layer 13 is preferably in the range of 1 µm to 10 µm, and more preferably in the range of 2 µm to 6 µm.

(Metal Foil Layer 14)

Various types of metal foil such as of aluminum and stainless steel may be used as the metal foil layer 14. The metal foil layer 14 is preferably aluminum foil from the perspective of processability such as moisture resistance, ductility and malleability, and cost. The aluminum foil may be a general soft aluminum foil, but aluminum foil containing iron is preferred for exhibiting good pinhole resistance, ductility and malleability when formed.

The aluminum foil containing iron (100 mass %) preferably has an iron content in the range of 0.1 mass % to 9.0 mass %, and more preferably 0.5 mass % to 2.0 mass %. The iron content of 0.1 mass % or more leads to a packaging material 10 having better pinhole resistance, and ductility and malleability. The iron content of 9.0 mass % or less enables a packaging material 10 having much better flexibility.

From the viewpoint of imparting desired ductility and malleability during forming, an annealed soft aluminum foil (e.g., aluminum foil made of the material 8021 or 8079 according to Japanese Industrial Standards) is even more preferred as the aluminum foil.

The metal foil used for the metal foil layer 14 is preferably degreased, for example, to obtain desired electrolyte resistance. To simplify the production process, the metal foil preferably has a surface that is not etched. The degreasing treatment, for example, may be of wet or dry type. However, dry degreasing treatment is preferred from the perspective of simplifying the production process.

The dry degreasing treatment may be one that can extend treatment time in the step of annealing the metal foil, for example. Adequate electrolyte resistance may be obtained with degreasing treatment that is carried out simultaneously with the annealing treatment for softening the metal foil.

The dry degreasing treatment may be one such as flame treatment or corona treatment, a treatment that is other than the annealing treatment. Further, the dry degreasing treatment may be one that oxidatively decomposes and removes contaminants using active oxygen generated by irradiating the metal foil with ultraviolet rays at a specific wavelength.

For example, the wet degreasing treatment may be an acid degreasing treatment, alkaline degreasing treatment, or the like. For example, the acid used for the acid degreasing treatment may be an inorganic acid such as sulfuric acid, nitric acid, hydrochloric acid, or hydrofluoric acid. These acids may be used singly or in combination of two or more. For example, the alkali used for the alkaline degreasing treatment may be sodium hydroxide having strong etching effects. Alkaline degreasing treatment may be performed using a material containing a weakly alkaline material, and a surfactant or the like. The wet degreasing treatment described above can be performed by immersion or spraying, for example.

From the perspective of barrier properties, pinhole resistance, and processability, the metal foil layer 14 preferably has a thickness in the range of 9 µm to 200 µm, more preferably 15 µm to 150 µm, and still more preferably 15 µm to 100 µm. A metal foil layer 14 with a thickness of 9 µm or more can reduce the occurrence of breakage when stress is applied during forming processing. A metal foil layer 14 with a thickness of 200 µm or less can prevent an increase in mass of the packaging material and minimize a decrease in weight energy density of the power storage device.

(Anticorrosion Treatment Layers 15a and 15b)

The anticorrosion treatment layers 15a and 15b reduce corrosion of the metal foil layer 14 caused by an electrolyte or hydrofluoric acid produced by reaction of the electrolyte with water. The anticorrosion treatment layer 15a increases the adhesive force between the metal foil layer 14 and the adhesive layer 13. By virtue of the anticorrosion treatment layer 15a having such effects, the adhesive layer 13 can be easily stretched in deep drawing of the power storage device packaging material 10, in which the substrate layer 11 and the metal foil layer 14 are stretched. Further, the anticorrosion treatment layer 15b increases the adhesive force between the metal foil layer 14 and the sealant adhesive layer 16. The anticorrosion treatment layers 15a and 15b may have the same configuration or different configurations. FIG. 1 illustrates the case where the anticorrosion treatment layers are respectively formed on both surfaces of the metal foil layer 14. However, the anticorrosion treatment layer may be formed on at least one surface of the metal foil layer 14, or may be formed on a surface facing the sealant adhesive layer 16. It should be noted that the power storage device packaging material of the present disclosure can be implemented even if the anticorrosion treatment layer is not provided.

The anticorrosion treatment layers 15a and 15b can be formed by, for example, applying degreasing treatment, hydrothermal conversion treatment, anodizing treatment, chemical conversion treatment, or coating-type anticorrosion treatment by which a coating agent having anticorrosion ability is coated, or a combination of these treatments, to a layer serving as a base material for the anticorrosion treatment layers 15a and 15b.

Of the treatments mentioned above, degreasing treatment, hydrothermal conversion treatment, and anodizing treatment, the hydrothermal conversion treatment and anodizing treatment in particular are treatments for dissolving a surface of the metal foil (aluminum foil) by use of a treatment agent, and forming a metal compound having good anticorrosion properties (aluminum compound (boehmite, alumite)). In this sense, these treatments may be embraced within the definition of chemical conversion treatments because they provide a co-continuous structure that is formed covering from the metal foil layer 14 to the anticorrosion treatment layers 15a and 15b.

Examples of the degreasing treatment include acid degreasing treatment and alkaline degreasing treatment. The acid degreasing treatment may be one using the inorganic acid mentioned above, such as sulfuric acid, nitric acid, hydrochloric acid, or hydrofluoric acid, singly, or using acid obtained by mixing them, or the like. Further, use of an acid degreasing agent, as the acid degreasing treatment, obtained by dissolving a fluorine-containing compound, such as monosodium ammonium bifluoride, with the above inorganic acid can not only exert the effects of degreasing the metal foil layer 14, but also form a passive-state metal fluoride, and is thus effective in terms of hydrofluoric acid resistance. Examples of the alkaline degreasing treatment include one using sodium hydroxide.

The hydrothermal conversion treatment may, for example, be boehmite treatment using boehmite obtained by immersing the metal foil layer 14 in boiling water with triethanolamine added thereto. For example, the anodizing treatment that can be used may be alumite treatment. Examples of the chemical conversion treatment mentioned above include chromate treatment, zirconium treatment, titanium treatment, vanadium treatment, molybdenum treatment, calcium phosphate treatment, strontium hydroxide treatment, cerium treatment, ruthenium treatment, or treatment that is a combination of two or more of these treatments. When performing the hydrothermal conversion treatment, anodizing treatment or chemical conversion treatment, the degreasing treatment described above is preferably performed in advance.

The chemical conversion treatment is not limited to a wet type, but may be one, for example, in which treatment agents used for the treatment are mixed with a resin component and applied. The anticorrosion treatment may preferably be of a coating type chromate treatment because it maximizes the anticorrosion effect and is convenient for liquid waste disposal.

The coating agent used in the coating type anticorrosion treatment of applying a coating agent having anticorrosion ability may be one which contains at least one selected from the group consisting of a rare earth element oxide sol, an anionic polymer and a cationic polymer. Particularly, a method using a coating agent containing a rare earth element oxide sol is preferred.

The method using a coating agent containing a rare earth element oxide sol is a pure coating type anticorrosion treatment. Use of this method can impart anticorrosion effects to the metal foil layer 14 even when generally used coating methods are used. The layer formed by use of a rare earth element oxide sol has an anticorrosion effect (inhibitor effect) on the metal foil layer 14 and these sols are favorable materials from an environmental aspect.

The rare earth element oxide sol contains a liquid dispersion medium in which microparticles (e.g., particles having a mean particle size of 100 nm or less) of rare earth element oxide are dispersed. The rare earth element oxide may be a cerium oxide, an yttrium oxide, a neodymium oxide, a lanthanum oxide, or other oxides. Among these oxides, a cerium oxide is preferred. Thus, adhesion with the metal foil layer 14 is further improved. Examples of the liquid dispersion medium used for the rare earth element oxide sol include various solvents such as water, alcoholic solvents, hydrocarbon-based solvents, ketone-based solvents, ester-based solvents, and ether-based solvents. Among these mediums, water is preferred. The anticorrosion treatment layers 15a and 15b may contain the rare earth element oxides singly or in combination of two or more.

To stabilize dispersion of the rare earth element oxide particles, the rare earth element oxide sol preferably contains a dispersion stabilizer, including an inorganic acid such as nitric acid, hydrochloric acid, or phosphoric acid, an organic acid such as acetic acid, malic acid, ascorbic acid, or lactic acid, or a salt thereof. Among these dispersion stabilizers, phosphoric acid or phosphate in particular is preferably used. Accordingly, there can be expected not only dispersion stabilization of the particles of a rare earth element oxide, but also effects of improving the adhesion with the metal foil layer 14 by making use of the chelating ability of phosphoric acid, imparting a resistance to electrolytic solution by the capture of metal ions (the formation of a passive state) dissolved out by the influence of hydrofluoric acid, and improving the cohesion force of the rare earth element oxide layer due to the likelihood of dehydration condensation of phosphoric acid even at low temperature in the applications of an packaging material for lithium ion battery. Examples of the phosphoric acid or the phosphate used as the dispersion stabilizer include orthophosphoric acid, pyrophosphoric acid, metaphosphoric acid, alkali metal salt or ammonium salt thereof, and the like. Among these materials, a condensed phosphoric acid, such as trimetaphosphoric acid, tetrametaphosphoric acid, hexametaphosphoric acid, and ultrametaphosphoric acid, or alkali metal salt or ammonium salt thereof is preferred in terms of allowing the packaging material for a lithium ion battery to express its functions. In particular, from the perspective of dry film formability (drying capacity, heat capacity) when forming a layer containing a rare earth oxide through various types of coating method using a coating composition containing the rare earth element oxide sol, an agent having good reactivity at low temperatures is preferred. Specifically, a sodium salt is preferred because of its good dehydration condensation properties at low temperatures. The phosphate is preferably a water-soluble salt. The anticorrosion treatment layers 15a and 15b may contain phosphoric acids or phosphates singly or in combination of two or more.

The rare earth element oxide sol preferably contains the phosphoric acid or the salt thereof in an amount of 1 part by mass or more, and more preferably 5 parts by mass or more, relative to 100 parts by mass of the rare earth element oxide. A content of 1 part by mass or more can well stabilize the sol and easily satisfy the functions as a packaging material for a lithium ion battery. The upper limit of blending amount of the phosphoric acid or salt thereof per 100 parts by mass of rare earth element oxide may be within a range not lowering the function of the rare earth element oxide sol, and is preferably 100 parts by mass or less, more preferably 50 parts by mass or less, and still more preferably 20 parts by mass or less, per 100 parts by mass of rare earth element oxide.

The layer formed of the rare earth element oxide sol is an aggregate of inorganic particles and therefore the cohesive force of the layer is low even after undergoing dry curing. To compensate the cohesive force of this layer, this layer is preferably complexed with an anionic polymer.

The anionic polymer may be a polymer having a carboxy group. For example, poly(meth)acrylic acid (or a salt thereof), or a copolymer containing poly(meth)acrylic acid as a main component may be used. The copolymerizable component of the copolymer includes: an alkyl(meth)acrylate monomer (wherein the alkyl group is a methyl group, an ethyl group, an n-propyl group, an i-propyl group, an n-butyl group, an i-butyl group, a t-butyl group, a 2-ethylhexyl group, a cyclohexyl group or the like); (meth)acrylamide, an N-alkyl(meth)acrylamide or an N,N-dialkyl(meth)acrylamide (wherein the alkyl group is a methyl group, an ethyl group, an n-propyl group, an i-propyl group, an n-butyl group, an i-butyl group, a t-butyl group, a 2-ethylhexyl group, a cyclohexyl group or the like); an N-alkoxy meth (acryl)amide or an N,N-dialkoxy(meth)acrylamide (wherein the alkoxy group is a methoxy group, an ethoxy group, a butoxy group, an isobutoxy group or the like); an amide-group containing monomer such as N-methylol(meth)acrylamide, N-phenyl(meth)acrylamide or the like; a hydroxyl group-containing monomer such as 2-hydroxyethyl(meth) acrylate, 2-hydroxypropyl (meth)acrylate or the like; a glycidyl group-containing monomer such as glycidyl(meth) acrylate, allyl glycidyl ether or the like; a silane-containing monomer such as (meth)acryloxypropyltrimethoxysilane, (meth)acryloxypropyltriethoxysilane or the like; or an isocyanate group-containing monomer such as (meth)acryloxypropyl isocyanate or the like. The examples also include styrene, α-methylstyrene, vinyl methyl ether, vinyl ethyl ether, maleic acid, alkyl maleate monoester, fumaric acid, alkyl fumarate monoester, itaconic acid, alkyl itaconate monoester, (meth)acrylonitrile, vinylidene chloride, ethylene, propylene, vinyl chloride, vinyl acetate, and butadiene.

The anionic polymer improves stability of the anticorrosion treatment layers 15a and 15b (oxide layers) obtained using the rare earth element oxide sol. The improvement is achieved by the effect of protecting the hard and brittle oxide layers with an acrylic resin component, and the effect of capturing ionic contamination (particularly, sodium ion) derived from the phosphate contained in the rare earth oxide sol (cation catcher). Specifically, when alkali metal ions or alkaline earth metal ions, such as of sodium in particular, are contained in the anticorrosion treatment layers 15a and 15b obtained using the rare earth element oxide sol, the anticorrosion treatment layers 15a and 15b easily deteriorate starting from the ion-containing site. Accordingly, by stabilizing the sodium ions or the like contained in the rare earth oxide sol using the anionic polymer, durability of the anticorrosion treatment layers 15a and 15b is improved.

The anticorrosion treatment layers 15a and 15b produced by combining the anionic polymer with the rare earth element oxide sol have anticorrosion ability equivalent to that of the anticorrosion treatment layers 15a and 15b formed by applying chromate treatment to the metal foil layer 14. The anionic polymer preferably has a structure in which a substantially water-soluble polyanionic polymer is cross-linked. For example, the cross-linking agent used for forming this structure may be a compound having an isocyanate group, a glycidyl group, a carboxy group, or an oxazoline group. Moreover, it is possible to introduce a cross-linking site having a siloxane bond by use of a silane coupling agent.

Examples of the compound having an isocyanate group include: diisocyanates such as tolylene diisocyanate, xylylene diisocyanate or hydrogenated products thereof, hexamethylene diisocyanate, 4,4'-diphenylmethane diisocyanate or hydrogenated products thereof, and isophorone diisocyanate; polyisocyanates including adduct forms of these isocyanates reacted with polyhydric alcohols such as trimethylolpropane, biuret forms obtained by reaction of the isocyanates with water, or isocyanurate forms that are trimers of the isocyanates; or blocked polyisocyanates obtained by blocking these polyisocyanates with alcohols, lactams, oximes and the like.

Examples of the compound having a glycidyl group include an epoxy compound obtained by permitting epichlorohydrin to act on a glycol, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, or neopentyl glycol; and an epoxy compound obtained by permitting epichlorohydrin to act on a polyhydric alcohol, such as glycerin, polyglycerin, trimethylolpropane, pentaerythritol, or sorbitol, or an epoxy compound obtained by permitting epichlorohydrin to act on a dicarboxylic acid, such as phthalic acid, terephthalic acid, oxalic acid, or adipic acid.

The compounds having a carboxy group include various aliphatic or aromatic dicarboxylic acids, and even include poly(meth)acrylic acids, or alkali (earth) metal salts of poly(meth)acrylic acids.

Examples of the compound having an oxazoline group include low molecular weight compounds having two or more oxazoline units. Alternatively, if polymerizable monomers such as isopropenyl oxazoline are used, the compounds may be obtained by copolymerizing acrylic monomers such as (meth)acrylic acid, (meth)acrylic alkyl esters, hydroxyalkyl (meth)acrylates, and the like.

The silane coupling agents may be γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, or γ-isocyanatopropylethoxysilane. Especially, from the perspective of reactivity with an anionic polymer, an epoxysilane, an aminosilane or an isocyanate silane is preferred.

The amount of cross-linking agent to be contained is preferably in the range of 1 part by mass to 50 parts by mass, and more preferably from 10 parts by mass to 20 parts by mass, relative to 100 parts by mass of the anionic polymer. When the ratio of the cross-linking agent is 1 part by mass or more relative to 100 parts by mass of the anionic polymer, a cross-linking structure is easily adequately formed. When the ratio of the crosslinking agent is not more than 50 parts by mass relative to 100 parts by mass of the anionic polymer, the pot life of the coating solution improves.

The method of cross-linking the anionic polymer is not limited to one using a cross-linking agent, but may be one using a titanium or zirconium compound to form ionic cross-linkage. The coating composition forming the anticorrosion treatment layer 15a may be applied to these materials.

The anticorrosion treatment layers 15a and 15b described above are formed as chemical conversion treatment layers on the metal foil layer 14 through chemical conversion treatment typified by chromate treatment. To form a graded structure with the metal foil layer 14, the metal foil layer 14 is treated, in the chemical conversion treatment, with a chemical conversion treatment agent, which particularly contains hydrofluoric acid, hydrochloric acid, nitric acid, sulfuric acid or a salt thereof. The treated metal foil layer 14 is then reacted with a chromium or non-chromium compound to form the chemical conversion treatment layers thereon. However, the chemical conversion treatment using the chemical conversion treatment agent containing acid may entail degradation of the work environment and corrosion of the coating apparatus.

In contrast, the anticorrosion treatment layers 15a and 15b of coating type as mentioned above do not have to form a graded structure with the metal foil layer 14, unlike in the chemical conversion treatment typified by chromate treatment. Accordingly, the nature of the coating agent should not be restricted to acidity, alkalinity, neutrality, or the like, and accordingly a good work environment is achieved. Since an alternative to chromate treatment using a chromium compound is sought in terms of environmental health, from this perspective as well, the anticorrosion treatment layers 15a and 15b of a coating type are preferred.

As necessary, the anticorrosion treatment layers 15a and 15b may have a laminated structure in which a cationic polymer is further laminated. The cationic polymer may be polyethyleneimine, an ionic polymer complex made of a polyethyleneimine and a polymer having carboxylic acid, a primary amine-grafted acrylic resin having a primary amine grafted to a main acrylic backbone, polyallylamine or derivatives thereof, an aminophenol resin, or the like.

Examples of the "polymer having carboxylic acid" forming the ionic polymer complex include polycarboxylic acid (salt), a copolymer produced by introducing a comonomer into polycarboxylic acid (salt), and polysaccharides having a carboxy group. Examples of the polycarboxylic acid (salt) include polyacrylic acid, and ionic salts thereof. Examples of the polysaccharides having a carboxy group include carboxymethylcellulose, and ionic salts thereof. Examples of the ionic salts include an alkali metal salt and alkaline earth metal.

The primary amine-grafted acrylic resin is a resin having a primary amine grafted to a main acrylic backbone. The acrylic main backbone includes various monomers, such as poly(meth)acrylic acid, used for the acrylic polyol mentioned above. The primary amine grafted to the acrylic main backbone may be ethyleneimine, or the like.

The polyallylamine or a derivative thereof may be a homopolymer or a copolymer of allylamine, allylamine amide sulfate, diallylamine, dimethylallylamine, or the like. These amines may be used in the form of the free amine, or may be stabilized by acetic acid or hydrochloric acid. Further, the copolymer components may include maleic acid, sulfur dioxide, or the like. Furthermore, a primary amine may be partially methoxylated to impart thermal cross-linking properties thereto. These cationic polymers may be used singly or in combination of two or more. Among these cationic polymers, at least one selected from the group consisting of polyallylamine and derivatives thereof is preferred.

The cationic polymer is preferably used in combination with a cross-linking agent having a functional group that can react with amine/imine, such as a carboxy group or a glycidyl group. The cross-linking agent to be used in combination with the cationic polymer may be a polymer having a carboxylic acid that forms an ionic polymer complex with polyethyleneimine, of which examples include: polycarboxylic acid (salt), such as polyacrylic acid or ionic salt thereof; a copolymer produced by introducing a comonomer thereinto; polysaccharides having a carboxy group, such as carboxymethylcellulose or ionic salt thereof.

In the present embodiment, a cationic polymer is described as a component forming the anticorrosion treatment layers 15a and 15b. This is based on an intensive investigation using various compounds for finding those compounds which impart required electrolyte resistance and hydrofluoric acid resistance to the packaging material for a lithium ion battery. As a result, cationic polymers have been found to be compounds that can impart electrolyte resistance and hydrofluoric acid resistance to the packaging material. This is believed to be because fluorine ions are captured by the cationic group (anion catcher) and the metal foil layer 14 is prevented from being damaged. The cationic polymer is most preferred from the perspective of improving adhesion between the anticorrosion treatment layer 15b and the sealant adhesive layer 16. The cationic polymer, which is water soluble similarly to the anionic polymer mentioned above, can contribute to improving water resistance by forming a cross-linking structure using the cross-linking agent mentioned above. Thus, use of the cationic polymer also enables formation of a cross-linking structure. Accordingly, when the rare earth oxide sol is used for forming the anticorrosion treatment layers 15a and 15b, the cationic polymer may be used as the protective layers instead of the anionic polymer.

From the above description, combinations of the above coating type anticorrosion treatments may be (1) rare earth oxide sol alone, (2) anionic polymer alone, (3) cationic polymer alone, (4) rare earth oxide sol+anionic polymer (laminated composite), (5) rare earth oxide sol+cationic polymer (laminated composite), (6) (rare earth oxide sol+ anionic polymer: laminated composite)/cationic polymer (multilayer), (7) (rare earth oxide sol+cationic polymer: laminated composite)/anionic polymer (multilayer), and the like. Among these combinations, (1) and (4) through (7) are preferred, and (4) through (7) are more preferred. For the anticorrosion treatment layer 15a, (6) is particularly preferred because an anticorrosion effect and an anchor effect (adhesion improvement effect) are achieved by a single layer. For the anticorrosion treatment layer 15b, (6) and (7) are particularly preferred because it is easier to maintain the sealant layer 17 side electrolyte resistance. However, the present embodiment is not limited to the above combinations. The anticorrosion treatment may be selected as follows as an example. Specifically, when the sealant adhesive layer 16 is formed of a modified polyolefin resin, the cationic polymer is designed to be provided on the surface contacting the sealant adhesive layer 16 (e.g., configurations (5) and (6)) because the cationic polymer is a material that is most preferred in terms of good adhesion with a modified polyolefin resin that will be mentioned in the section of the sealant adhesive layer 16 below.

The anticorrosion treatment layers 15a and 15b should not be limited to the layers described above. For example, they may be formed by using an agent produced by adding phosphoric acid and a chromium compound to a resin binder (aminophenol resin etc.), as in a coating type chromate-based on a known technique. Use of this treatment agent enables formation of a layer that is both corrosion-resistant and adhesive. To improve adhesion, the chemical conversion treatment layer described above (the layer formed through degreasing treatment, hydrothermal conversion treatment, anodizing treatment, chemical conversion treatment, or a combination thereof) may be treated in a composite manner using the cationic polymer and/or the anionic polymer mentioned above. Alternatively, using these treatments in combination, the cationic polymer and/or the anionic polymer may be laminated as a multilayer structure. While the stability of the coating agent has to be considered, a layer that is both corrosion-resistant and adhesive can be achieved by using a coating agent that is a one-liquid product of the rare earth oxide sol and the cationic polymer or the anionic polymer, prepared in advance.

The anticorrosion treatment layers 15a and 15b preferably have mass per unit area in the range of 0.005 g/m$^2$ to 0.200 g/m$^2$, and more preferably 0.010 g/m$^2$ to 0.100 g/m$^2$. With the mass per unit area of 0.005 g/m$^2$ or more, the metal foil layer 14 can be easily made corrosion-resistant. The mass per unit area exceeding 0.200 g/m$^2$ will saturate the corrosion resistance and make it remain substantially unchanged. In contrast, when a rare earth oxide sol is used and the coating is thick, thermal curing will be insufficient when dried and the cohesive force may decrease. Although the above description has been given using mass per unit area, the specific gravity, if available, can be used in terms of thickness.

From the perspective of anticorrosive and anchoring functions, the anticorrosion treatment layers 15a and 15b may each preferably have a thickness, for example, in the range of 10 nm to 5 μm, and more preferably 20 nm to 500 nm.

(Sealant Adhesive Layer 16)

The sealant adhesive layer 16 adheres the sealant layer 17 to the metal foil layer 14 on which the anticorrosion treatment layer 15b is formed. The packaging material 10 is roughly categorized into a thermal lamination structure and a dry lamination structure depending on the adhesive component forming the sealant adhesive layer 16.

The adhesive component forming the sealant adhesive layer 16 in the thermal lamination structure is preferably an acid modified polyolefin-based resin obtained by graft-modifying a polyolefin-based resin with acid. The acid modified polyolefin-based resin, which has a polar group introduced into part of the nonpolar polyolefin-based resin, can firmly adhere to both the sealant layer 17 formed of a nonpolar polyolefin-based resin film or the like, and the anticorrosion treatment layer 15b which usually has polarity. Use of the acid modified polyolefin-based resin improves resistance of the packaging material 10 to the contents such as the electrolyte, and easily prevents lowering of the adhesive force due to deterioration of the sealant adhesive layer 16 even when hydrofluoric acid is produced inside the battery.

Examples of the polyolefin-based resin for the acid modified polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. The polyolefin resin may also be a copolymer obtained by copolymerizing polar molecules such as of acrylic acid or methacrylic acid with those materials mentioned above, a polymer such as cross-linked polyolefin, or the like. The acid to modify the polyolefin-based resin may be carboxylic acid, an epoxy compound, acid anhydride, or the like, and maleic anhydride is preferred. The acid modified polyolefin-based resins used for the sealant adhesive layer 16 may be used singly or in combination of two or more.

The sealant adhesive layer 16 of the thermal lamination structure is formed by extruding the adhesive component mentioned above with an extruder. The sealant adhesive layer 16 of the thermal lamination structure preferably has a thickness in the range of 2 μm to 50 μm.

The adhesive component forming the sealant adhesive layer 16 of the dry lamination structure may be ones, for example, similar to those mentioned for the adhesive layer 13. In this case, to reduce swelling due to the electrolyte, and hydrolysis due to the hydrofluoric acid, the composition of the adhesive is preferably designed so as to contain a main resin with a backbone not easily hydrolyzed, and improve cross-linking density.

To improve cross-linking density, another substance may be added to the adhesive, the substance being, for example, a dimer fatty acid, an ester or a hydrogenated product of the dimer fatty acid, a reduced glycol of the dimer fatty acid, or a reduced glycol of the ester or the hydrogenated product of the dimer fatty acid. The dimer fatty acid may be obtained by dimerizing various unsaturated fatty acids, and can have a structure, for example, of acyclic type, monocyclic type, polycyclic type, and aromatic ring type.

The fatty acid as a starting material of the dimer fatty acid is not particularly limited. Using such dimer fatty acid as an essential component, a dibasic acid such as that used for ordinary polyester polyol may be introduced. The curing agent that can be used for the base resin forming the sealant adhesive layer 16 may, for example, be an isocyanate compound that can also be used as a chain elongation agent for polyester polyol. Thus, cross-linking density of the adhesive coating increases, which leads to improving solubility and swelling properties. Furthermore, substrate adhesion is also expected to be improved due to increase in urethane group concentration.

The sealant adhesive layer 16 having the dry laminate structure has a bonding part such as of an ester group and a urethane group which is easily hydrolysable. Therefore, for usage requiring higher reliability, an adhesive component having a thermal lamination structure is preferably used as the sealant adhesive layer 16. For example, the various curing agents mentioned above may be added to a coating agent that contains a solvent, such as toluene or methylcyclohexane (MCH), in which the acid modified polyolefin resin is dissolved or dispersed, followed by coating and drying to thereby form the sealant adhesive layer 16.

When forming the sealant adhesive layer 16 using extrusion molding, the adhesive resin tends to be oriented in MD (extrusion direction) due to the stress or the like generated during the extrusion molding. In this case, to alleviate the anisotropy of the sealant adhesive layer 16, an elastomer may be added to the sealant adhesive layer 16. As the elastomer to be added to the sealant adhesive layer 16, for example, an olefin-based elastomer, a styrene-based elastomer, or the like may be used.

The elastomer preferably has a mean particle size that can improve miscibility of the elastomer with the adhesive resin and improve the effect of alleviating the anisotropy of the sealant adhesive layer 16. Specifically, for example, the elastomer preferably has a mean particle size of 200 nm or less.

The mean particle size of the elastomer is determined, for example, by capturing an enlarged image of a cross section of the elastomer composition using an electron microscope, followed by image analysis for measurement of a mean particle size of the dispersed cross-linked rubber components. The elastomers mentioned above may be used singly or in combination of two or more.

If an elastomer is added to the sealant adhesive layer 16, the amount of addition to the sealant adhesive layer 16 (100 mass %) is preferably, for example, in the range of 1 mass % to 25 mass %, and more preferably 10 mass % to 20 mass %. When the amount of addition of the elastomer is 1 mass % or more, improvement is likely to be achieved in miscibility with the adhesive resin, and also in the effect of alleviating the anisotropy of the sealant adhesive layer 16. When the amount of addition of the elastomer is 25 mass % or less, improvement is likely to be achieved in the effect of reducing swelling of the sealant adhesive layer 16 due to the electrolyte.

The sealant adhesive layer 16 may, for example, be a dispersed adhesive resin solution obtained by dispersing an adhesive resin in an organic solvent.

The sealant adhesive layer 16, when provided in a thermal lamination structure, preferably has a thickness in the range of 2 μm to 50 μm, and more preferably 20 μm to 40 μm. The sealant adhesive layer 16 having a thickness of 2 μm or more can easily obtain adequate adhesion strength between the metal foil layer 14 and the sealant layer 17. The sealant adhesive layer 16 having a thickness of 50 μm or less can easily reduce the amount of water penetrating from an end surface of the packaging material into the battery elements in the interior. The sealant adhesive layer 16, when provided to a dry lamination structure, preferably has a thickness in the range of 1 μm to 5 μm. The sealant adhesive layer 16 having a thickness of 1 μm or more can easily obtain adequate adhesion strength between the metal foil layer 14 and the sealant layer 17. The sealant adhesive layer 16 having a thickness of 5 μm or less can reduce occurrence of cracking therein.

(Sealant Layer 17)

The sealant layer 17 imparts sealability to the packaging material 10 when heat sealed, and thus is located on the inside and fused, when the power storage device is assembled. The sealant layer 17 may be a resin film made of a polyolefin-based resin or an acid-modified polyolefin-based resin obtained by graft-modifying a polyolefin-based resin with acid such as maleic anhydride. Of these materials, a polyolefin-based resin is preferred because it improves barrier properties against water vapor and can form the shape of the power storage device without being excessively deformed by heat sealing, and polypropylene is particularly preferred.

Examples of the polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. These polyolefin-based resins may be used singly or in combination of two or more.

To the polypropylenes of the types mentioned above, that is, random polypropylene, homo polypropylene, and block polypropylene, substances may be added such as a low crystallinity ethylene-butene copolymer, a low crystallinity propylene-butene copolymer, terpolymer formed of a three-component copolymer of ethylene, butene, and propylene, an anti-blocking agent (AB agent), such as silica, zeolite, and acrylic resin beads, and a slip agent, such as a fatty acid amide, or the like.

Examples of the acid-modified polyolefin-based resin include those described in connection with the sealant adhesive layer 16.

The sealant layer 17 may be a single layer film or may be a multilayer film, and may be selected according to the required properties. For example, to impart moisture resistance, a multilayer film with interposition of resins, such as an ethylene-cyclic olefin copolymer and polymethylpentene, may be used.

The sealant layer 17 may contain various additives, such as a flame retardant, a slip agent, an anti-blocking agent, an antioxidant, a photostabilizer, and a tackifier.

The sealant layer 17 may be a heat sealable film formed by extrusion. In this case, the orientation of the sealable film tends to conform to the direction of its extrusion. Therefore, from the perspective of alleviating anisotropy of the sealant layer 17 due to orientation, an elastomer may be added to the heat sealable film. With the addition of an elastomer, blushing of the sealant layer 17 can be reduced when the power storage device packaging material 10 is cold-formed for formation of a recess.

The elastomer that can be used for forming the sealant layer 17 may be, for example, the same materials as those mentioned as the elastomer forming the sealant adhesive layer 16. When the sealant layer 17 has a multilayer film structure, at least one of the plurality of layers constituting the structure may be ensured to contain the elastomer. For example, when the sealant layer 17 has a three-layer laminated structure of random polypropylene layer/block polypropylene layer/random polypropylene layer, the elastomer may be added to only the block polypropylene layer or only to the random polypropylene layers, or may be added to both the random polypropylene layers and the block polypropylene layer.

The sealant layer 17 may contain a lubricant to impart lubricity thereto. Then, when a recess is formed in the power storage device packaging material 10 by cold forming, the sealant layer 17 containing a lubricant can prevent the packaging material 10 from being stretched more than necessary in the areas to be shaped into sides and corners of the recess where the stretching degree is high. Thus, separation is prevented from occurring between the metal foil layer 14 and the sealant adhesive layer 16, or breakage or blushing due to cracks is prevented from occurring in the sealant layer 17 and the sealant adhesive layer 16.

When the sealant layer 17 contains a lubricant, the content in the sealant layer 17 (100 mass %) is preferably in the range of 0.001 mass % to 0.5 mass %. When the content of lubricant is 0.001 mass % or more, blushing of the sealant layer 17 tends to be even more reduced during cold forming. When the content of lubricant is 0.5 mass % or less, lowering in adhesion strength is likely to be minimized with respect to a surface of another layer contacting a surface of the sealant layer 17.

The sealant layer 17 preferably has a thickness in the range of 10 μm to 100 μm, and more preferably 20 μm to 60 μm. The sealant layer 17 with a thickness of 10 μm or more achieves adequate heat sealing strength. The sealant layer 17 with a thickness of 100 μm or less reduces the amount of water vapor penetrating from an end of the packaging material.

[Method of Producing Packaging Material]

A method of producing the packaging material 10 will be described. The method of producing the packaging material 10 should not be limited to the methods described below.

For example, the method of producing the packaging material 10 may include the following steps S11 to S14.

Step S11: Forming the anticorrosion treatment layer 15a on a surface of the metal foil layer 14 and forming the anticorrosion treatment layer 15b on the other surface of the metal foil layer 14.

Step S12: Forming the adhesion-enhancing treatment layer 12 on a surface of the substrate layer 11 to obtain a laminate.

Step S13: Bonding a surface of the anticorrosion treatment layer 15a on a side facing away from the metal foil layer 14 to the adhesion-enhancing treatment layer 12 side surface of the laminate via the adhesive layer 13.

Step S14: Forming the sealant layer 17 on a surface of the anticorrosion treatment layer 15b on a side facing away from the metal foil layer 14 via the sealant adhesive layer 16.

(Step S11)

At step S11, an anticorrosion treatment layer 15a is formed on a surface of a metal foil layer 14 and an anticorrosion treatment layer 15b is formed on the other surface of the metal foil layer 14. The anticorrosion treatment layers 15a and 15b may be formed separately or simultaneously. Specifically, for example, an anticorrosion treatment agent (base material of the anticorrosion treatment layers) is applied to both surfaces of the metal foil layer 14, sequentially followed by drying, curing, and baking to simultaneously form anticorrosion treatment layers 15a and 15b. Alternatively, an anticorrosion treatment agent may be applied to a surface of the metal foil layer 14, sequentially followed by drying, curing, and baking to form the anticorrosion treatment layer 15a; and then the anticorrosion treatment layer 15b may be similarly formed on the other surface of the metal foil layer 14. The order of forming the anticorrosion treatment layers 15a and 15b is not particularly limited. The anticorrosion treatment agent may be different or the same between the anticorrosion treatment layers 15a and 15b. As the anticorrosion treatment agent, for example, one used for coating type chromate treatment, or the like may be used. Examples of the method of applying the anticorrosion treatment agent include, but are not particularly limited to, gravure coating, gravure reverse coating, roll coating, reverse roll coating, die coating, bar coating, kiss coating, and comma coating. As the metal foil layer 14, an untreated metal foil layer may be used, or a metal foil layer subjected to wet or dry degreasing treatment may be used.

(Step S12)

At step S12, an adhesion-enhancing treatment layer 12 is formed on a surface of a substrate layer 11. A method of forming the adhesion-enhancing treatment layer 12 will be described herein taking in-line coating as an example. First, an aqueous coating liquid is prepared by dispersing the above resin serving as a main component of the adhesion-enhancing treatment layer 12 with a dispersant. Then, the aqueous coating liquid is applied to a surface of a thermoplastic resin film (base material of the substrate layer 11) that has not yet completed crystalline orientation. Then, the applied aqueous coating liquid is dried, followed by stretching the thermoplastic resin film at least in a uniaxial direction.

Then, the thermoplastic resin film is heat-treated to complete orientation thereof to obtain a laminate with an adhesion-enhancing treatment layer 12 being formed on a surface of the substrate layer 11. The adhesion-enhancing treatment layer 12 formed through such in-line coating contributes to improving adhesion between the substrate layer 11 and the adhesion-enhancing treatment layer 12. Any method may be used for forming the adhesion-enhancing treatment layer 12, not being limited to one described above. In addition, the timing of forming the adhesion-enhancing treatment layer 12 is not limited to the timing shown in the present embodiment.

(Step S13)

At step S13, a surface of the anticorrosion treatment layer 15a on a side facing away from the metal foil layer 14 is bonded to the adhesion-enhancing treatment layer 12 side surface of the laminate by dry lamination or the like, using an adhesive that forms the adhesive layer 13. At step S13, the resultant laminate may be aged at a temperature in the range of room temperature to 100° C. to accelerate adhesion. Aging time, for example, is 1 day to 10 days. The temperature and time in the aging treatment are selected so that the adhesive constituting the adhesive layer 13 can be sufficiently cured. Accordingly, the yield stress and the breaking elongation or the glass transition temperature of the adhesive layer 13 included in the packaging material 10 can be obtained by the above aging treatment.

(Step S14)

Subsequent to step S13, a sealant layer 17 is formed on the laminate in which the substrate layer 11, the adhesion-enhancing treatment layer 12, the adhesive layer 13, the anticorrosion treatment layer 15a, the metal foil layer 14, and the anticorrosion treatment layer 15b, which are laminated in this order. Specifically, the sealant layer 17 is formed on a surface of the anticorrosion treatment layer 15b on a side facing away from the metal foil layer 14 via the sealant adhesive layer 16. The sealant layer 17 may be laminated by dry lamination, sandwich lamination, or the like, or may be laminated by coextrusion together with the sealant adhesive layer 16. To improve adhesion, the sealant layer 17 is preferably laminated by, for example, sandwich lamination or laminated by coextrusion together with the sealant adhesive layer 16, and is more preferably laminated by sandwich lamination.

The packaging material 10 is obtained through the steps S11 to S14 described above. The order of steps in the method of producing the packaging material 10 is not limited to that of the above method in which steps S11 to S14 are sequentially performed. The order of steps may be appropriately changed. For example, step S12 may be followed by step S11.

[Power Storage Device]

A power storage device provided with the packaging material 10 as a container will be described. The power storage device includes a battery element 1 including electrodes, leads 2 extending from the electrodes, and a container sandwiching the leads 2 and holding the battery element 1. The container is formed of the power storage device packaging material with the sealant layer 17 inside. The container may be obtained by overlapping two packaging materials with the sealant layers 17 face-to-face, and heat-sealing the edge portions of the overlapped packaging materials 10, or may be obtained by folding a single packaging material so that the surfaces are overlapped with each other and similarly heat-sealing the edge portions of the packaging material 10. The power storage device may have a packaging material 10 as a container. Examples of the power storage device include secondary batteries such as lithium ion batteries, nickel hydride batteries, and lead batteries, and electrochemical capacitors such as electric double layer capacitors.

The leads 2 are sandwiched and held, and hermetically sealed by the packaging material 10, forming the container with the sealant layer 17 on the inside. The leads 2 may be sandwiched and held by the packaging material 10 via a tab sealant.

[Method of Producing Power Storage Device]

Figure 3A:
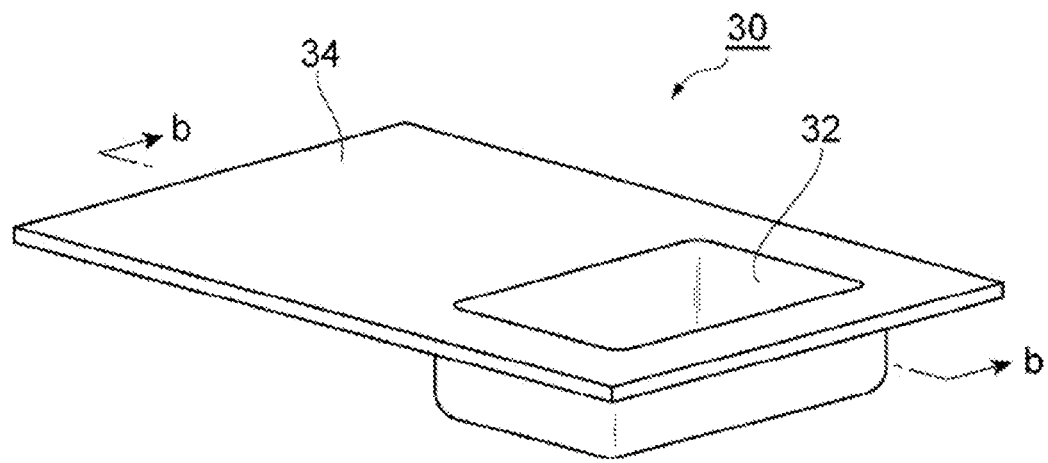
FIG. 3A is a perspective view of an embossed packaging material obtained by using the power storage device packaging material according to an embodiment of the present disclosure.
Figure 3B:
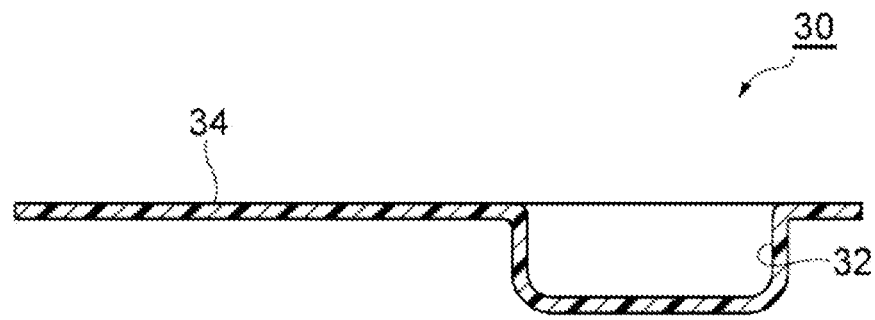
FIG. 3B is a vertical cross-sectional view of the embossed packaging material shown in FIG. 3A taken along the line b-b.
Figure 4A:
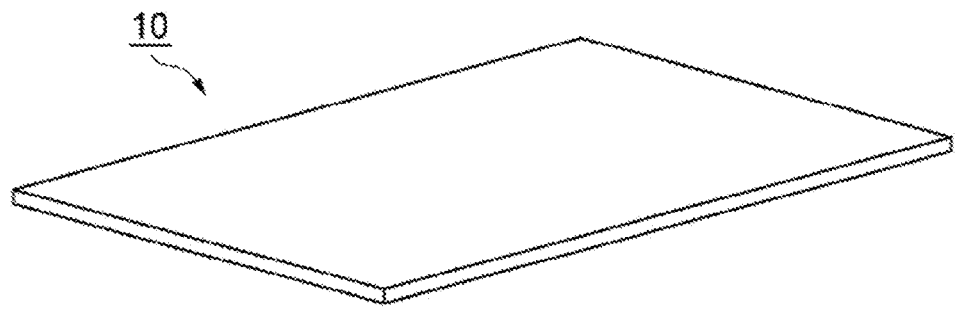
FIGS. 4A, 4B, 4C, and 4D are perspective views illustrating steps of producing a secondary battery by using the power storage device packaging material according to an embodiment of the present disclosure.
Figure 4B:
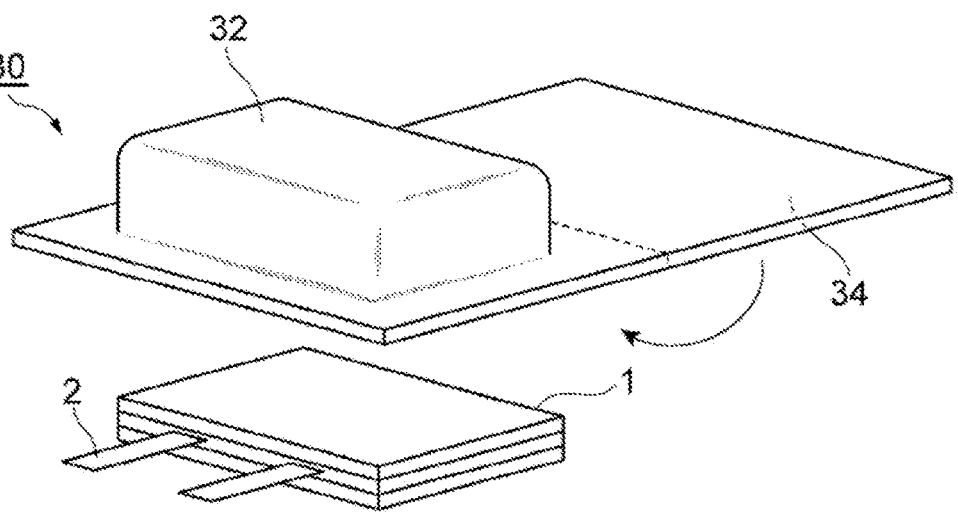
Figure 4C:
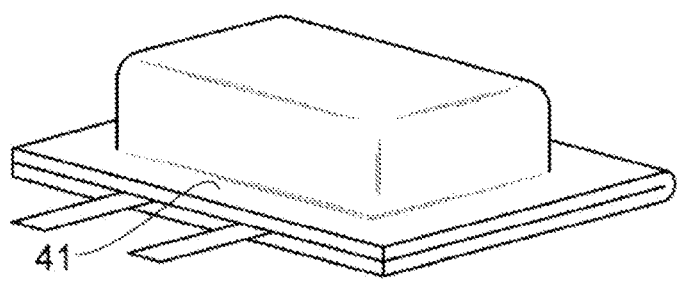
Figure 4D:
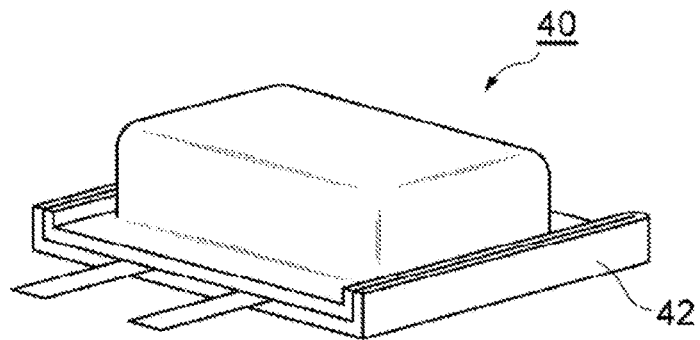

A method of producing a power storage device using the packaging material 10 will be described. The following description is given taking as an example the case of producing a secondary battery 40 using an embossed packaging material 30. FIGS. 3A and 3B are diagrams each illustrating the embossed packaging material 30. FIGS. 4A, 4B, 4C, and 4D are perspective views illustrating a process of producing a single-sided battery using the packaging material 10. That is, FIG. 4A illustrates that the power storage device packaging material is prepared. FIG. 4B illustrates that the power storage device packaging material that is embossed and the battery element are prepared. FIG. 4C illustrates that the power storage device packaging material is folded and the ends are fused. FIG. 4D illustrates that portions on both sides of the fold are folded upward. The secondary battery 40 may be a double-sided battery produced by providing two packaging materials such as the embossed packaging material 30, and bonding the packaging materials to each other while adjusting the alignment. Further, the embossed packaging material 30 may also be formed using the packaging material 10.

The secondary battery 40, which is a single-sided battery, can be produced, for example, through the following steps S21 to S25.

Step S21: Preparing the packaging material 10, the battery element 1 including electrodes, and the leads 2 extending from the electrodes.

Step S22: Forming the recess 32 on one side of the packaging material 10 so as to accommodate the battery elements 1 (see FIGS. 4A and 4B).

Step S23: Placing the battery element 1 in the formed area (recess 32) of the embossed packaging material 30, folding back the embossed packaging material 30 so as to cover the recess 32 with a cover portion 34, and pressure heat-sealing on one side of the embossed packaging material 30 to thereby sandwich and hold the leads 2 extending from the battery element 1 (see FIGS. 4B and 4C).

Step S24: Pressure heat-sealing another side, leaving one side other than the side sandwiching and holding the leads 2 unsealed, followed by injecting an electrolyte from the unsealed side and pressure heat-sealing the unsealed side in a vacuum (see FIG. 4C).

Step S25: Trimming the ends of the pressure heat sealed sides other than the side sandwiching and holding the leads 2, and bending the end portions towards the formed area (recess 32) (FIG. 4D).

(Step S21)

At step S21, the packaging material 10, the battery element 1 including electrodes, and the leads 2 extending from the electrodes are prepared. The packaging material 10 is prepared based on the embodiment described above. The battery element 1 and the leads 2 are not particularly limited, but a known battery element 1 and known leads 2 may be used.

(Step S22)

At step S22, a recess 32 for accommodating the battery element 1 is formed by shaping the sealant layer 17 side of the packaging material 10. The recess 32 has a shape such as a rectangular shape in plan view conforming to the shape of the battery element 1. The recess 32 is formed, for example, by pressing a pressing member having a rectangular pressing surface against part of the packaging material 10 in the thickness direction thereof. Further, the position to be pressed, i.e., the position where the recess 32 is to be formed, is deviated from the center of the packaging material 10 cut in a rectangular shape toward one end of the packaging material 10 in the longitudinal direction. Thus, after shaping processing, the other end portion having no recess 32 is folded back to provide a cover (cover portion 34).

More specifically, the method of forming the recess 32 may be one using a die (deep drawing). The forming method may be one that uses a female die and a male die arranged with a gap equal to or greater than the thickness of the packaging material 10 therebetween, so that the male die together with the packaging material 10 is inserted into the female die. The depth (deep drawing degree) of the recess 32 can be adjusted as desired by adjusting insertion of the male die. With the recess 32 being formed in the packaging material 10, an embossed packaging material 30 is obtained. The embossed packaging material 30 has a shape as illustrated in FIGS. 3A and 3B, for example. FIG. 3A is a perspective view of the embossed packaging material 30 and FIG. 3B is a longitudinal cross-sectional view of the embossed packaging material 30 taken along the line b-b of FIG. 3A.

(Step S23)

At step S23, the battery element 1 including a cathode, a separator, an anode, and the like are disposed in the formed area (recess 32) of the embossed packaging material 30. The leads 2 extending from the battery element 1 and respectively joined to the cathode and the anode are drawn out of the formed area (recess 32). The embossed packaging material 30 is then folded back at the approximate center thereof in the longitudinal direction so that surfaces of the sealant layer 17 are located on the inside and overlaid with each other, followed by pressure heat-sealing the side of the embossed packaging material 30 sandwiching and holding the leads 2. The pressure heat sealing is controlled by three conditions of temperature, pressure, and time, which are appropriately set. The pressure heat sealing is preferably performed at a temperature of not less than a temperature fusing the sealant layer 17.

The thickness of the sealant layer 17 before being heat-sealed is preferably in the range of 40% to 80% relative to the thickness of the leads 2. With the thickness of the sealant layer 17 being not less than the lower limit, the heat-sealing resin tends to adequately fill the end portions of the leads 2. With the thickness of the sealant layer 17 being not more than the upper limit, the thickness of the end portions of the packaging material 10 of the secondary battery 40 can have a moderate thickness, reducing the amount of moisture penetrating from the end portions of the packaging material 10.

(Step S24)

At step S24, the sides of the packaging material are pressure heat-sealed, leaving a side other than the side sandwiching and holding the leads 2 unsealed. An electrolyte is then injected from the unsealed side, which is then pressure heat-sealed in vacuum. The pressure heat-sealing conditions are similar to those of step S23.

(Step S25)

The end portions of the pressure heat-sealed sides except for the side sandwiching and holding the leads 2 are trimmed to remove the portion of the sealant layer 17 extending out of the end portions. Then, the peripheral pressure heat-sealed portion is folded back toward the formed area 32 to form a folded-back portion 42. Thus, the secondary battery 40 is obtained.

Embodiments of the power storage device packaging material and the method of producing the power storage device of the present disclosure have so far been described in detail. However, the present disclosure should not be construed as being limited to these specific embodiments, and may be variously modified and changed within the spirit of the present disclosure recited in the claims.

EXAMPLES

In the following description, the present disclosure will be described in more detail by way of examples. However, the present invention should not be limited to the following examples.

Example 1-1

In Example 1-1, a power storage device packaging material 10 according to a first aspect was produced in the following manner. As a metal foil layer 14, soft aluminum foil 8079 with a thickness of 40 μm (manufactured by Toyo Aluminium K.K.) was used. A sodium polyphosphate-stabilized cerium oxide sol (anticorrosion treatment agent) was applied to both surfaces of the metal foil layer 14 by gravure coating. The sol was prepared using distilled water as a solvent, and controlled to have a solid content concentration of 10 mass %. The sol contained 10 parts by mass of phosphoric acid, relative to 100 parts by mass of cerium oxide.

Then, the applied sodium polyphosphate-stabilized cerium oxide sol was dried and then baked to form an anticorrosion treatment layer 15a on a surface of the metal foil treatment 14 and an anticorrosion treatment layer 15b on the other surface. The baking conditions were 150° C. temperature and 30-second treatment time.

Then, a 25 μm-thick polyester film was used as the substrate layer 11, and one surface of the substrate layer 11 was corona-treated.

Then, a polyurethane-based adhesive as an adhesive layer 13 was applied to a surface of the anticorrosion treatment layer 15a on a side facing away from the metal foil layer 14. The polyurethane-based adhesive was prepared by mixing a base resin made of polyol and a hardener made of isocyanate. Then, the metal foil layer 14 was adhered to the corona-treated surface of the substrate layer 11 via the adhesive layer 13 by dry lamination. After that, the structure made up of the substrate layer 11, the adhesive layer 13, the anticorrosion treatment layer 15a, the metal foil layer 14, and the anticorrosion treatment layer 15b was left standing in atmospheric air at 60° C. for 6 days for aging treatment. The thickness of the adhesive layer 13 was 4 μm. Then, as described below, a power storage device packaging material 10 having a thermal lamination structure was produced.

A sealant adhesive layer 16 was formed by extruding maleic anhydride modified polypropylene (Trade name: ADMER, manufactured by Mitsui Chemicals, Inc.) serving as a base material of the sealant adhesive layer 16. The thickness of the sealant adhesive layer 16 was 15 μm. Then, a 30 μm-thick polyolefin film (non-stretched polypropylene film having a corona-treated surface on the sealant adhesive layer 16 side) serving as the sealant layer 17 was bonded (heat-pressure bonded) to the anticorrosion treatment layer 15b at 160° C. via the sealant adhesive layer 16 by sandwich lamination. Thus, a power storage device packaging material 10 was produced.

Examples 1-2 to 1-4, Comparative Examples 1-1 to 1-5

A power storage device packaging material 10 was produced in the same manner as in Example 1-1 except that the mixing ratio of the base resin and the hardener in the polyurethane-based adhesive constituting the adhesive layer 13 was different from Example 1-1.

Example 1-5

A power storage device packaging material 10 was produced in the same manner as in Example 1-2 except that the adhesion-enhancing treatment layer 12 was formed on a surface of the substrate layer 11 facing the adhesive layer 13 instead of corona-treatment being applied to one surface of the substrate layer 11. A coating agent serving as a base material of the adhesion-enhancing treatment layer 12 was applied to one surface of the substrate layer 11 by in-line coating so as to have a solid content of 0.1 g/m², followed by drying, thereby forming an adhesion-enhancing treatment layer 12 with a thickness of approximately 0.1 μm.

A coating agent prepared as below was used as a coating agent for forming an adhesion-enhancing treatment layer.

Coating agent: Self-emulsifying polyisocyanate "Aquanate 100", manufactured by Nippon Polyurethane Industry Co., Ltd., and spherical silica microparticles "Seahostar KEP30" (average particle size of 0.3 μm), manufactured by Nippon Shokubai Co., Ltd., were added to a water-soluble polyester "Aron Melt PES-1000", manufactured by Toagosei Co., Ltd., at a blending ratio (mass ratio) of 95/5/0.5 and diluted with water.

Example 1-6

A power storage device packaging material 10 was prepared in the same manner as in Example 1-2 except that the anticorrosion treatment layers 15a and 15b were formed by chromate treatment instead of forming the anticorrosion treatment layers 15a and 15b using the sodium polyphosphate stabilized cerium oxide sol. The chromate treatment was performed by applying a treatment liquid, which contained a phenolic resin, a chromium fluoride compound, and phosphoric acid, onto both surfaces of the metal foil layer 14 to form respective coating films, followed by baking.

<Measurement of Yield Stress and Breaking Elongation>

The polyurethane-based adhesive which has been used for forming the adhesive layer 13 in each example and comparative example was applied on an AL plate so that the thickness of the sample became 4.0 μm, and left standing at 60° C. for 6 days for aging treatment. The adhesive layer after aging was peeled from the AL plate, and cut into a width of 5 mm and a length of 20 mm to thereby prepare a measurement sample. A tensile load was applied to the measurement sample at a tension rate of 6 mm/min by using a tensile tester while holding both ends in the longitudinal direction of the measurement sample with a jig. Thus, the relationship between the load (stress) and the deformation (elongation) was charted in the graph (stress-strain curve). Table 1 shows the results of the yield stress $\sigma_y$ (N/cm²), which is a stress value at the yield point Y of the obtained stress-strain curve and the breaking elongation $\varepsilon_f$(%), which is an elongation rate at the breaking point F.

<Evaluation of Drawing Depth>

For the power storage device packaging materials 10 produced in the examples and comparative examples, drawing depth of deep drawing was evaluated by the following method. First, the power storage device packaging material 10 was positioned in a forming apparatus with the sealant layer 17 facing upward. The forming depth of the forming apparatus was set to a ratio of 3.5 to 7.0 mm per 0.05 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD). The presence/absence of breakage and pinholes in the cold-formed area was visually checked by irradiating the packaging material 10 with light to thereby obtain a maximum drawing depth (forming limit) with which the packaging material was deep-drawn causing neither breakage nor pinholes. Evaluation was made based on the following criteria. Table 1 shows the forming limit and formability evaluation result.

A: The drawing limit was 5.50 mm or more.

B: The drawing limit was 5.00 mm or more and less than 5.50 mm

C: The drawing limit was 4.40 mm or more and less than 5.00 mm

D: The drawing limit was less than 4.40 mm.

TABLE 1

| | Adhesive layer | | Substrate layer | Metal foil layer | Formability | |
|---|---|---|---|---|---|---|
| | Yield stress [N/cm²] | Breaking elongation [%] | Surface treatment of adhesive surface | Surface treatment | Forming limit | Evaluation result |
| Comparative Example 1-1 | 1735 | 408 | Corona | Cerium oxide | Less than 4.40 | D |
| Comparative Example 1-2 | 2030 | 372 | Corona | Cerium oxide | Less than 4.40 | D |
| Comparative Example 1-3 | 2784 | 280 | Corona | Cerium oxide | Less than 4.40 | D |
| Comparative Example 1-4 | 3411 | 224 | Corona | Cerium oxide | Less than 4.40 | D |
| Example 1-1 | 3923 | 186 | Corona | Cerium oxide | 5.00 | B |
| Example 1-2 | 4523 | 136 | Corona | Cerium oxide | 5.00 | B |
| Example 1-3 | 5509 | 105 | Corona | Cerium oxide | 5.50 | A |
| Example 1-4 | 6075 | 47 | Corona | Cerium oxide | 4.75 | C |
| Comparative Example 1-5 | 6800 | 39 | Corona | Cerium oxide | Less than 4.40 | D |
| Example 1-5 | 4400 | 142 | Adhesion enhancement | Cerium oxide | 5.50 | A |
| Example 1-6 | 4550 | 140 | Corona | Chromate | 4.75 | C |

From the results shown in Table 1, it is found that excellent deep drawing properties were obtained in the Examples. Further, it is found that further improved deep drawing properties were obtained by applying a surface treatment to the substrate layer and the metal foil layer to improve the adhesiveness.

Example 2-1

In Example 2-1, a power storage device packaging material 10 according to a second aspect was produced in the following manner. As a metal foil layer 14, soft aluminum foil 8079 with a thickness of 30 μm (manufactured by Toyo Aluminium K.K.) was used. A sodium polyphosphate-stabilized cerium oxide sol (anticorrosion treatment agent) was applied to both surfaces of the metal foil layer 14 by gravure coating. The sol was prepared using distilled water as a solvent, and controlled to have a solid content concentration of 10 mass %. The sol contained 10 parts by mass of phosphoric acid, relative to 100 parts by mass of cerium oxide.

Then, the applied sodium polyphosphate-stabilized cerium oxide sol was dried and then baked to form an anticorrosion treatment layer 15a on a surface of the metal foil treatment 14 and an anticorrosion treatment layer 15b on the other surface. The baking conditions were 150° C. temperature and 30-second treatment time.

Then, a 25 μm-thick polyester film (Trade name: EMBLET, manufactured by Toyobo Co., Ltd.) was used as the substrate layer 11, and one surface of the substrate layer 11 was corona-treated.

Then, a polyurethane-based adhesive was obtained by mixing a base resin made of polyether polyol and a hardener made of hexamethylene diisocyanate-isocyanurate form (HDI-N) so that the ratio $N_C/N_B$, which is the ratio of the quantity of isocyanate group, or the hardener reactive group, $N_C$, to the quantity of hydroxyl group, or the base resin reactive group, $N_B$, became 10. A polyurethane-based adhesive as an adhesive layer 13 was applied to a surface of the anticorrosion treatment layer 15a on a side facing away from the metal foil layer 14. Then, the metal foil layer 14 was adhered to the corona-treated surface of the substrate layer 11 via the adhesive layer 13 by dry lamination. After that, the structure made up of the substrate layer 11, the adhesive layer 13, the anticorrosion treatment layer 15a, the metal foil layer 14, and the anticorrosion treatment layer 15b was left standing in atmospheric air at 80° C. for 4 days for aging treatment. The thickness of the adhesive layer 13 was 5 μm. Then, as described below, a power storage device packaging material 10 having a thermal lamination structure was produced.

A sealant adhesive layer 16 was formed by extruding maleic anhydride modified polypropylene (Trade name: ADMER, manufactured by Mitsui Chemicals, Inc.) serving as a base material of the sealant adhesive layer 16. The thickness of the sealant adhesive layer 16 was 15 μm. Then, a 30 μm-thick polyolefin film (non-stretched polypropylene film having a corona-treated surface on the sealant adhesive layer 16 side) serving as the sealant layer 17 was bonded (heat-pressure bonded) to the anticorrosion treatment layer 15b at 160° C. via the sealant adhesive layer 16 by sandwich lamination. Thus, a power storage device packaging material 10 was produced.

Comparative Example 2-1

A power storage device packaging material 10 was produced in the same manner as in Example 2-1 except that only the polyether polyol used in Example 2-1 was applied as the adhesive layer 13.

Example 2-2

An epoxy-amine based adhesive was obtained by mixing a base resin made of epoxy resin and a hardener made of amine so that the ratio $N_C/N_B$, which is the ratio of the quantity of amine groups, or the hardener reactive group, $N_C$, to the quantity of epoxy groups, or the base resin reactive group, $N_B$, became 2. A power storage device packaging material 10 was produced in the same manner as in Example 2-1 except that an epoxy-amine based adhesive was applied as the adhesive layer 13.

Examples 2-3 to 2-5 and Comparative Examples 2-2 to 2-3

An epoxy-amine based adhesive used in Comparative Example 2-2, Examples 2-3, 2-4, 2-5, and Comparative Example 2-3 was obtained by mixing a base resin made of epoxy resin and a hardener made of amine so that the ratio $N_C/N_B$ became 1, 2.2, 2.5, 3, and 4, respectively. Power storage device packaging materials 10 of Examples 2-3 to 2-5 and Comparative Examples 2-2 to 2-3 were produced in the same manner as in Example 2-1 except that the above epoxy-amine based adhesives were applied as the adhesive layer 13, and left standing at 50° C. for 3 days instead of 80° C. for 4 days.

Comparative Example 2-4

Then, a polyurethane-based adhesive was obtained by mixing a base resin made of polyester polyol and a hardener made of hexamethylene diisocyanate-biuret form (HDI-B) so that the ratio $N_C/N_B$ became 20. A power storage device packaging material 10 was produced in the same manner as in Example 2-1 except that the urethane-based adhesive was applied as the adhesive layer 13.

Example 2-6

Then, a polyurethane-based adhesive was obtained by mixing a base resin made of polyester polyol and a hardener made of hexamethylene diisocyanate-isocyanurate form (HDI-N) so that the ratio $N_C/N_B$ became 20. A power storage device packaging material 10 was produced in the same manner as in Example 2-1 except that the urethane-based adhesive was applied as the adhesive layer 13.

Examples 2-7 and 2-8

Polyurethane-based adhesives used in Examples 2-7 and 2-8 were obtained by mixing a base resin made of polyester polyol and a hardener made of tolylene diisocyanate-isocyanurate form (TDI-N) so that the ratio $N_C/N_B$ became 20 and 15, respectively. Power storage device packaging materials 10 of Examples 2-7 and 2-8 were produced in the same manner as in Example 2-1 except that the urethane-based adhesive was applied as the adhesive layer 13.

Example 2-9

Then, a polyurethane-based adhesive was obtained by mixing a base resin made of polyester polyol and a hardener made of tolylene diisocyanate-adduct form (TDI-A) so that the ratio $N_C/N_B$ became 26.7. A power storage device packaging material 10 was produced in the same manner as in Example 2-1 except that the urethane-based adhesive was applied as the adhesive layer 13.

Example 2-10

A power storage device packaging material 10 was produced in the same manner as in Example 2-9 except that an anticorrosion treatment layers 15a was not provided on one surface of the metal foil layer 14.

Example 2-11

A power storage device packaging material 10 was prepared in the same manner as in Example 2-9 except that the anticorrosion treatment layers 15a and 15b were formed by chromate treatment instead of forming the anticorrosion treatment layers 15a and 15b using the sodium polyphosphate stabilized cerium oxide sol. The chromate treatment was performed by applying a treatment liquid, which contained a phenolic resin, a chromium fluoride compound, and phosphoric acid, onto both surfaces of the metal foil layer 14 to form respective coating films, followed by baking.

Example 2-12

A power storage device packaging material 10 was produced in the same manner as in Example 2-9 except that the adhesion-enhancing treatment layer 12 was formed on a surface of the substrate layer 11 facing the adhesive layer 13 instead of corona-treatment being applied to one surface of the substrate layer 11. An acrylic resin coating agent serving as a base material of the adhesion-enhancing treatment layer 12 was applied to a surface of the substrate layer 11 by in-line coating so as to have a solid content of 0.1 g/m², followed by drying, thereby forming an adhesion-enhancing treatment layer 12 with a thickness of approximately 0.1 µm.

Example 2-13

A power storage device packaging material 10 was produced in the same manner as in Example 2-9 except that the adhesion-enhancing treatment layer 12 was formed on a surface of the substrate layer 11 facing the adhesive layer 13 instead of corona-treatment being applied to one surface of the substrate layer 11. A coating agent serving as a base material of the adhesion-enhancing treatment layer 12 was applied to one surface of the substrate layer 11 by in-line coating so as to have a solid content of 0.1 g/m², followed by drying, thereby forming an adhesion-enhancing treatment layer 12 with a thickness of approximately 0.1 µm.

A coating agent prepared as below was used as a coating agent for forming an adhesion-enhancing treatment layer.

Coating agent: Self-emulsifying polyisocyanate "Aquanate 100", manufactured by Nippon Polyurethane Industry Co., Ltd., and spherical silica microparticles "Seahostar KEP30" (average particle size of 0.3 µm), manufactured by Nippon Shokubai Co., Ltd., were added to a water-soluble polyester "Aron Melt PES-1000", manufactured by Toagosei Co., Ltd., at a blending ratio (mass ratio) of 95/5/0.5 and diluted with water.

<Measurement of Glass Transition Temperature>

The adhesive which has been used for forming the adhesive layer 13 in each example and comparative example was applied on a polyethylene terephthalate (PET) film with a thickness of 5 µm. A predetermined aging treatment was applied to the adhesive on the PET film. The PET film and the adhesive on the PET film after the aging treatment were cut into a predetermined size, set in a rigid-body pendulum type physical properties tester (Trade name: RPT-3000W, A&D Company, Ltd.). Then, the glass transition temperature of the adhesive (adhesive layer) after aging treatment was measured according to ISO 12013-2 (method for measuring the thermal properties (Tg, hardness) of the coating film). For the polyurethane-based adhesives, the glass transition temperature was measured after being left standing at 80° C. and for 4 days (aging treatment). For the epoxy-amine based adhesives, the glass transition temperature was measured after being left standing at 50° C. and for 3 days. Table 2 shows the measurement results of the glass transition temperature as Tg.

<Evaluation of Drawing Depth>

For the power storage device packaging materials 10 produced in the examples and comparative examples, drawing depth of deep drawing was evaluated by the following method. First, the power storage device packaging material 10 was positioned in a forming apparatus with the sealant layer 17 facing upward. The forming depth of the forming apparatus was set to a ratio of 3.0 to 7.0 mm per 0.25 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD). The presence/absence of breakage and pinholes in the cold-formed area was visually checked by irradiating the packaging material 10 with light to thereby obtain a maximum drawing depth (forming limit) with which the packaging material was deep-drawn causing neither breakage nor pinholes. Evaluation was made based on the following criteria. Table 2 shows the forming limit and formability evaluation result.

A: The drawing limit was 5.00 mm or more.
B: The drawing limit was 4.00 mm or more and less than 5.00 mm
C: The drawing limit was 3.00 mm or more and less than 4.00 mm
D: The drawing limit was less than 3.00 mm.

TABLE 2

| Content | Adhesive layer Tg (° C.) | Adhesion-enhancing layer Adhesion-enhancing material | Anticorrosion treatment layer between adhesive layer and metal foil layer | Adhesive layer Base resin | Adhesive layer Hardener | $N_C/N_B$ | Formability Forming limit | Formability Evaluation result |
|---|---|---|---|---|---|---|---|---|
| Comparative Example 2-1 | 47 | — | Cerium oxide | Polyester polyol | — | 0 | 2.00 | D |
| Comparative Example 2-2 | 132 | — | Cerium oxide | Epoxy | Amine | 1 | 2.75 | D |
| Example 2-1 | 140 | — | Cerium oxide | Polyether polyol | HDI-N | 10 | 3.50 | C |
| Example 2-2 | 148 | — | Cerium oxide | Epoxy | Amine | 2 | 3.50 | C |
| Example 2-3 | 151 | — | Cerium oxide | Epoxy | Amine | 2.2 | 3.50 | C |
| Example 2-4 | 158 | — | Cerium oxide | Epoxy | Amine | 2.5 | 3.50 | C |
| Example 2-5 | 160 | — | Cerium oxide | Epoxy | Amine | 3 | 3.25 | C |
| Comparative Example 2-3 | 170 | — | Cerium oxide | Epoxy | Amine | 4 | 2.50 | D |
| Comparative Example 2-4 | 185 | — | Cerium oxide | Polyester polyol | HDI-B | 20 | 2.75 | D |
| Example 2-6 | 148 | — | Cerium oxide | Polyester polyol | HDI-N | 20 | 3.75 | C |
| Example 2-7 | 146 | — | Cerium oxide | Polyester polyol | TDI-N | 20 | 4.00 | B |
| Example 2-8 | 149 | — | Cerium oxide | Polyester polyol | TDI-N | 15 | 4.00 | B |
| Example 2-9 | 149 | — | Cerium oxide | Polyester polyol | TDI-A | 26.7 | 4.25 | B |
| Example 2-10 | 149 | — | Not Provided | Polyester polyol | TDI-A | 26.7 | 3.50 | C |
| Example 2-11 | 149 | — | Chromate | Polyester polyol | TDI-A | 26.7 | 4.25 | B |
| Example 2-12 | 149 | Acrylic resin | Cerium oxide | Polyester polyol | TDI-A | 26.7 | 4.50 | B |
| Example 2-13 | 149 | Polyester resin | Cerium oxide | Polyester polyol | TDI-A | 26.7 | 5.00 | A |

From the results shown in Table 2, it is found that excellent deep drawing properties were obtained in Examples 2-1 to 2-13 in which the glass transition temperature (Tg) of the adhesive layer was within the range of 140 to 160° C. Further, it is found that further improved deep drawing properties were obtained by applying a surface treatment to the substrate layer and the metal foil layer to improve the adhesiveness.

REFERENCE SIGNS LIST

1: Battery element; 2: Lead; 10: Packaging material (power storage device packaging material); 11: Substrate layer; 12: Adhesion-enhancing treatment layer; 13: Adhesive layer; 14: Metal foil layer; 15*a*, 15*b*: Anticorrosion treatment layer; 16: Sealant adhesive layer' 17: Sealant layer; 30: Embossed packaging material; 32: Formed area (recess); 34: Cover portion; 40: Secondary battery; Y: Yield point; F: Breaking point.

What is claimed is:

1. A power storage device packaging material, comprising:
a structure including at least a substrate layer, an adhesive layer, a metal foil layer, a sealant adhesive layer, and a sealant layer, which are laminated in this order,
wherein the adhesive layer has a yield stress in the range of 3500 to 6500 N/cm$^2$ and breaking elongation of 45 to 200% in a stress-strain curve determined by a tensile test at a tension rate of 6 mm/min, and wherein the adhesive layer is made of a two-part curing type polyurethane-based adhesive comprising a base resin made of polyol and a hardener made of an isocyanate compound, wherein a molar ratio of a quantity of NC groups in the hardener, to a quantity of hydroxyl groups in the base resin is from 10 to 30.

2. The power storage device packaging material of claim 1, further comprising an adhesion-enhancing treatment layer provided between the substrate layer and the adhesion layer.

3. The power storage device packaging material of claim 2, wherein the adhesion-enhancing treatment layer is a layer including at least one resin selected from a group consisting of a polyester resin, an acrylic resin, a polyurethane resin, an epoxy resin, and an acrylic grafted polyester resin.

4. The power storage device packaging material of claim 1, further comprising anticorrosion treatment layers respectively provided on both surfaces of the metal foil layer.

5. The power storage device packaging material of claim 4, wherein the anticorrosion treatment layers include a rare earth element oxide, and phosphoric acid or phosphate.

6. The power storage device packaging material of claim 5, wherein the rare earth element oxide is a cerium oxide.

7. A power storage device comprising: a battery element including electrodes; leads respectively extending from the electrodes; and a container accommodating the battery element, wherein
the container is formed of the power storage device packaging material of claim 1 with the sealant layer being located on the inside.

8. A power storage device packaging material comprising a structure including at least a substrate layer, an adhesive layer, a metal foil layer, a first anticorrosion treatment layer, a sealant adhesive layer, and a sealant layer, which are laminated in this order, wherein
the adhesive layer has a glass transition temperature in a range of 140° C. or more and 160° C. or less and wherein the adhesive layer is made of a two-part curing type polyurethane-based adhesive comprising a base resin made of polyol and a hardener made of an isocyanate compound, wherein a molar ratio of a quantity of NC groups in the hardener, to a quantity of hydroxyl groups in the base resin is from 10 to 30.

9. The power storage device packaging material of claim 8, wherein the isocyanate compound is an aromatic isocyanate compound.

10. The power storage device packaging material of claim 9, wherein the aromatic isocyanate compound is an adduct form of diisocyanate.

11. The power storage device packaging material of claim 8, further comprising a second anticorrosion treatment layer provided between the adhesive layer and the metal foil layer.

12. The power storage device packaging material of claim 8, further comprising an adhesion-enhancing treatment layer provided between the substrate layer and the adhesive layer, wherein
the adhesion-enhancing treatment layer is a layer including at least one resin selected from a group consisting of a polyester resin, an acrylic resin, a polyurethane resin, an epoxy resin, and an acrylic grafted polyester resin.

13. The power storage device packaging material of claim 8, further comprising an adhesion-enhancing treatment layer provided between the substrate layer and the adhesive layer, wherein
the adhesion-enhancing treatment layer is a layer including a polyester resin.

* * * * *